US012633600B2

(12) United States Patent (10) Patent No.: US 12,633,600 B2
Park et al. (45) Date of Patent: May 19, 2026

(54) ELECTRONIC DEVICE INCLUDING BATTERY

(71) Applicant: SAMSUNG ELECTRONICS CO., LTD., Suwon-si (KR)

(72) Inventors: Hyungwoo Park, Suwon-si (KR); Shihyun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 925 days.

(21) Appl. No.: 17/939,307

(22) Filed: Sep. 7, 2022

(65) Prior Publication Data

US 2023/0029753 A1 Feb. 2, 2023

Related U.S. Application Data

(63) Continuation of application No. PCT/KR2022/010165, filed on Jul. 13, 2022.

(30) Foreign Application Priority Data

Jul. 30, 2021 (KR) ........................ 10-2021-0100843

(51) Int. Cl.
*H01M 50/14* (2021.01)
*H01M 10/04* (2006.01)
(Continued)

(52) U.S. Cl.
CPC ....... *H01M 50/14* (2021.01); *H01M 10/0431* (2013.01); *H01M 10/425* (2013.01);
(Continued)

(58) Field of Classification Search
CPC .. H01M 50/14; H01M 50/247; H01M 50/502; H01M 50/531; H01M 50/178;
(Continued)

(56) References Cited

U.S. PATENT DOCUMENTS

2012/0171556 A1* 7/2012 Kim ..................... H01M 50/536
429/174
2020/0203755 A1* 6/2020 Kang ................ H01M 10/0587

FOREIGN PATENT DOCUMENTS

CN 101494300 7/2009
KR 20-0434773 12/2006
(Continued)

OTHER PUBLICATIONS

Search Report dated Oct. 21, 2022 issued in International Patent Application No. PCT/KR2022/010165.

*Primary Examiner* — Jane J Rhee
(74) *Attorney, Agent, or Firm* — Nixon & Vanderhye P.C.

(57) ABSTRACT

An electronic device including a battery is disclosed. According to an example embodiment, the electronic device may include: a housing, a printed circuit board (PCB) disposed inside the housing, and a battery disposed inside the housing and configured to supply power to the electronic device. The battery may include: an electrode assembly including a plurality of substrates having a surface coated with a mixture layer, the plurality of substrates being stacked and insulated through a separator and including a pouch in which the electrode assembly is disposed, a protective frame disposed in the pouch and configured to protect the electrode assembly from an external impact, and a protection circuit module (PCM) comprising circuitry connected to the battery cell and electrically connected to the PCB. The protective frame may include: a central portion disposed to cross an inside of the electrode assembly in a direction perpendicular to a stacking direction of the substrates, and at least one cover connected to at least one end of the central portion and extending in a direction parallel to the stacking direction to surround at least a portion of an outer surface of the electrode assembly.

18 Claims, 21 Drawing Sheets

(51) Int. Cl.

| | |
|---|---|
| *H01M 10/42* | (2006.01) |
| *H01M 50/105* | (2021.01) |
| *H01M 50/178* | (2021.01) |
| *H01M 50/202* | (2021.01) |
| *H01M 50/247* | (2021.01) |
| *H01M 50/284* | (2021.01) |
| *H01M 50/531* | (2021.01) |
| *H04M 1/02* | (2006.01) |

(52) U.S. Cl.
 CPC ....... *H01M 50/105* (2021.01); *H01M 50/178* (2021.01); *H01M 50/202* (2021.01); *H01M 50/247* (2021.01); *H01M 50/284* (2021.01); *H01M 50/531* (2021.01); *H01M 2220/30* (2013.01); *H04M 1/0202* (2013.01)

(58) Field of Classification Search
 CPC ............. H01M 50/105; H01M 50/284; H01M 10/0431; H01M 10/425; H01M 2220/30
 See application file for complete search history.

(56) References Cited

FOREIGN PATENT DOCUMENTS

| | | |
|---|---|---|
| KR | 10-2014-0090335 | 7/2014 |
| KR | 10-2015-0144602 | 12/2015 |
| KR | 10-1671176 | 11/2016 |
| KR | 10-2017-0059238 | 5/2017 |
| KR | 10-2018-0053160 | 5/2018 |
| KR | 10-2018-0130800 | 12/2018 |
| KR | 10-2139491 | 7/2020 |

* cited by examiner

ELECTRONIC DEVICE INCLUDING BATTERY

CROSS-REFERENCE TO RELATED APPLICATIONS

This application is a continuation of International Application No. PCT/KR2022/010165 designating the United States, filed on Jul. 13, 2022, in the Korean Intellectual Property Receiving Office and claiming priority to Korean Patent Application No. 10-2021-0100843 filed on Jul. 30, 2021, in the Korean Intellectual Property Office, the disclosures of which are incorporated by reference herein in their entireties.

BACKGROUND

1. Field

The disclosure relates to an electronic device including a battery.

2. Description of Related Art

A portable electronic device may include an embedded battery and may be driven using power supplied by the battery. The battery may include a battery cell generating a voltage based on a movement of electrons and a pouch accommodating the battery cell.

A battery embedded in an electronic device may include an electrode assembly that generates a voltage through a positive electrode and a negative electrode that are insulated through a separator. The electrode assembly may be provided in a roll type wound around an axis or a stack type with a plurality of electrodes stacked sequentially. An impact applied to the battery may damage the electrodes or the separator included in the electrode assembly or deform a shape of the electrode assembly, which may degrade the performance of the battery and increase the heat generated in the battery. Thus, the battery may need to be protected against the impact.

SUMMARY

Embodiments of the disclosure provide an electronic device including a battery.

Embodiments of the disclosure protect a battery cell from an impact applied from outside and secure the stability of a battery.

Embodiments of the disclosure support an outer surface of an electrode assembly using a protective frame and improve the durability and stability in using a battery.

According to an example embodiment, an electronic device may include: a housing, a printed circuit board (PCB) disposed inside the housing, and a battery disposed inside the housing and configured to supply power to the electronic device. The battery may include: a battery cell including an electrode assembly including a plurality of substrates a surface of which is coated with a mixture layer and stacked and insulated through a separator, including a pouch accommodating the electrode assembly, a protective frame accommodated inside the pouch and configured to protect the electrode assembly from an external impact, and a protection circuit module (PCM) comprising circuitry connected to the battery cell and electrically connected to the PCB. The protective frame may include: a central portion disposed to cross an inside of the electrode assembly in a direction perpendicular to a stacking direction in which the substrates are stacked, and at least one cover connected to at least one end of the central portion and extending in a direction parallel to the stacking direction to cover at least a portion of an outer surface of the electrode assembly.

According to an example embodiment, an electronic device may include: a housing, a printed circuit board (PCB) disposed inside the housing, a battery disposed inside the housing and configured to supply power to the electronic device. The battery may include: an electrode assembly including a plurality of substrates a surface of which is coated with a mixture layer and stacked and insulated through a separator, and wound around a first winding axis, a protective frame including a central portion inserted in the electrode assembly in a direction parallel to the first winding axis, and a cover connected to an end of the central portion and covering at least a portion of an outer surface of the electrode assembly, a pouch accommodating the electrode assembly and the protective frame, and a protection circuit module (PCM) comprising circuitry connected to the electrode assembly and electrically connected to the PCB.

According to an example embodiment, a battery disposed inside an electronic device may include: a battery cell including a pair of cell areas arranged at an interval therebetween, and a folding area foldably connecting the cell areas, a plurality of protective frames connected to the cell areas and configured to protect an outer surface of the cell areas, and a protection circuit module (PCM) comprising circuitry connected to the battery cell and electrically connected to a PCB of the electronic device. The battery cell may include: a plurality of substrates a surface of which is coated with a mixture layer, having a longitudinal direction extending along the cell areas with the folding area therebetween, and stacked and insulated through a separator. Each of the protective frame includes: a central portion disposed to cross the cell areas of the electrode assembly in a direction perpendicular to the stacking direction of the substrates; and at least one cover connected to an end on an outer side of the central portion and extending in a direction parallel to the stacking direction to cover the cell areas.

According to various example embodiments, a protective frame connected to an electrode assembly may protect the electrode assembly from an external impact.

According to various example embodiments, a protective frame may cover an outer surface of an electrode assembly and may thereby prevent and/or reduce the electrode assembly from being deformed by an external impact.

According to various example embodiments, a protective frame may pass through an inside of an electrode assembly to be inserted therein, which may thus prevent/inhibit a connection of the protective frame to the electrode assembly from being released.

Other features and aspects will be apparent from the following detailed description, the drawings, and the claims.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
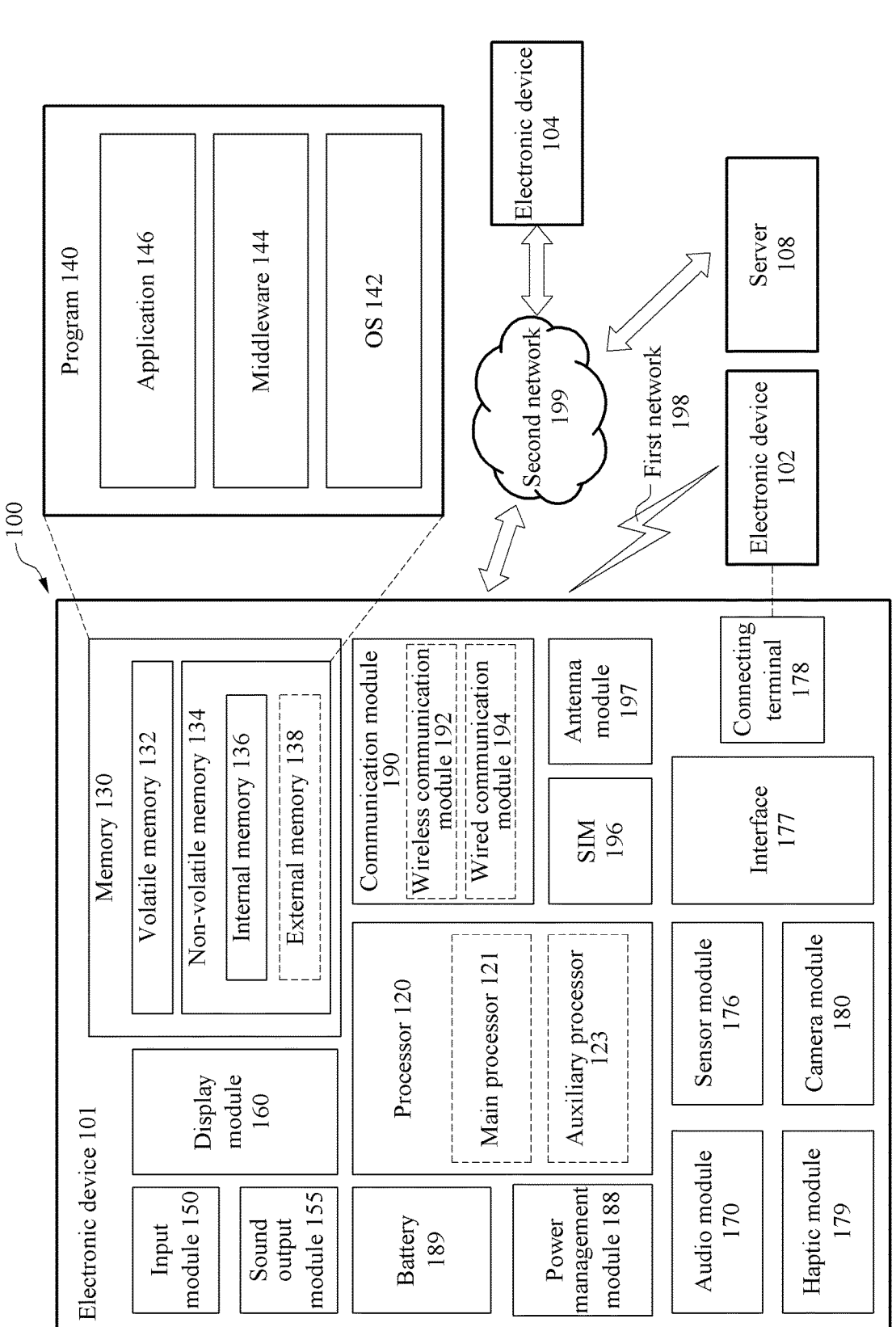
FIG. 1 is a block diagram illustrating an example electronic device in a network environment according to various embodiments.

Hereinafter, various example embodiments will be described in greater detail with reference to the accompanying drawings. When describing the example embodiments with reference to the accompanying drawings, like reference numerals refer to like elements and a repeated description related thereto will be omitted.

FIG. 1 is a block diagram illustrating an example electronic device in a network environment according to various embodiments. Referring to FIG. 1, an electronic device 101 in a network environment 100 may communicate with an electronic device 102 via a first network 198 (e.g., a short-range wireless communication network), or communicate with at least one of an electronic device 104 and a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In various example embodiments, at least one (e.g., the connecting terminal 178) of the above components may be omitted from the electronic device 101, or one or more other components may be added in the electronic device 101. In various example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with, the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence (AI) model processing. An AI model may be generated by machine learning. Such learning may be performed by, for example, the electronic device 101 in which the AI model is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may alternatively or additionally include a software structure other than the hardware structure.

The memory 130 may store various data used by at least one component (e.g., the processor 120 or the sensor module 176) of the electronic device 101. The data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing records. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector, and a control circuitry to control a corresponding one of the display, the hologram device, and the projector. According to an example embodiment, the display module 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with an external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and an external electronic device (e.g., the electronic device 102, the electronic device 104, or the server 108) and performing communication via the established communication channel. The communication module 190 may include one or more communication processors that are operable independently of the processor 120 (e.g., an AP) and that support direct (e.g., wired) communication or wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beamforming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated high-frequency band (e.g., the mmWave band), and a plurality of antennas (e.g., array antennas) disposed on a second surface (e.g., a top or a side surface) of the PCB or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general-purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an example embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least a part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least a part of a reply to the request. To that end, a cloud computing, distributed computing, mobile edge computing (MEC), or client-server computing technology may be used, for example. The electronic device 101 may provide ultra-low latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

According to various example embodiments, an electronic device may be a device of one of various types. The electronic device may include, as non-limiting examples, a portable communication device (e.g., a smartphone, etc.), a computing device, a portable multimedia device, a portable medical device, a camera, a wearable device, a home appliance, or the like. However, the electronic device is not limited to the foregoing examples.

It should be understood that various example embodiments of the present disclosure and the terms used therein are not intended to limit the technological features set forth herein to some particular embodiments but include various changes, equivalents, or replacements of the example embodiments. In connection with the description of the drawings, like reference numerals may be used for similar or related components. It should be understood that a singular form of a noun corresponding to an item may include one or more of the things, unless the relevant context clearly indicates otherwise. As used herein, "A or B," "at least one of A and B," "at least one of A or B," "A, B, or C," "at least one of A, B, and C," and "A, B, or C," each of which may include any one of the items listed together in the corresponding one of the phrases, or all possible combinations thereof. Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure. It should also be understood that, when a component (e.g., a first component) is referred to as being "connected to" or "coupled to" another component with or without the term "functionally" or "communicatively," the component can be connected or coupled to the other component directly (e.g., wiredly), wirelessly, or via a third component.

As used in connection with various example embodiments of the disclosure, the term "module" may include a unit implemented in hardware, software, or firmware, or any combination thereof, and may interchangeably be used with other terms, for example, "logic," "logic block," "part," or "circuitry." A module may be a single integral component, or a minimum unit or part thereof, adapted to perform one or more functions. For example, according to an example embodiment, the module may be implemented in the form of an application-specific integrated circuit (ASIC).

Various example embodiments set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The "non-transitory" storage medium is a tangible device, and may not include a signal (e.g., an electromagnetic wave), but this term does not differentiate between where data is semi-permanently stored in the storage medium and where the data is temporarily stored in the storage medium.

According to various example embodiments, a method according to an example embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components or operations may be omitted, or one or more other components or operations may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration.

According to various example embodiments, operations performed by the module, the program, or another component may be carried out sequentially, in parallel, repeatedly, or heuristically, or one or more of the operations may be executed in a different order or omitted, or one or more other operations may be added.

Figure 2A:
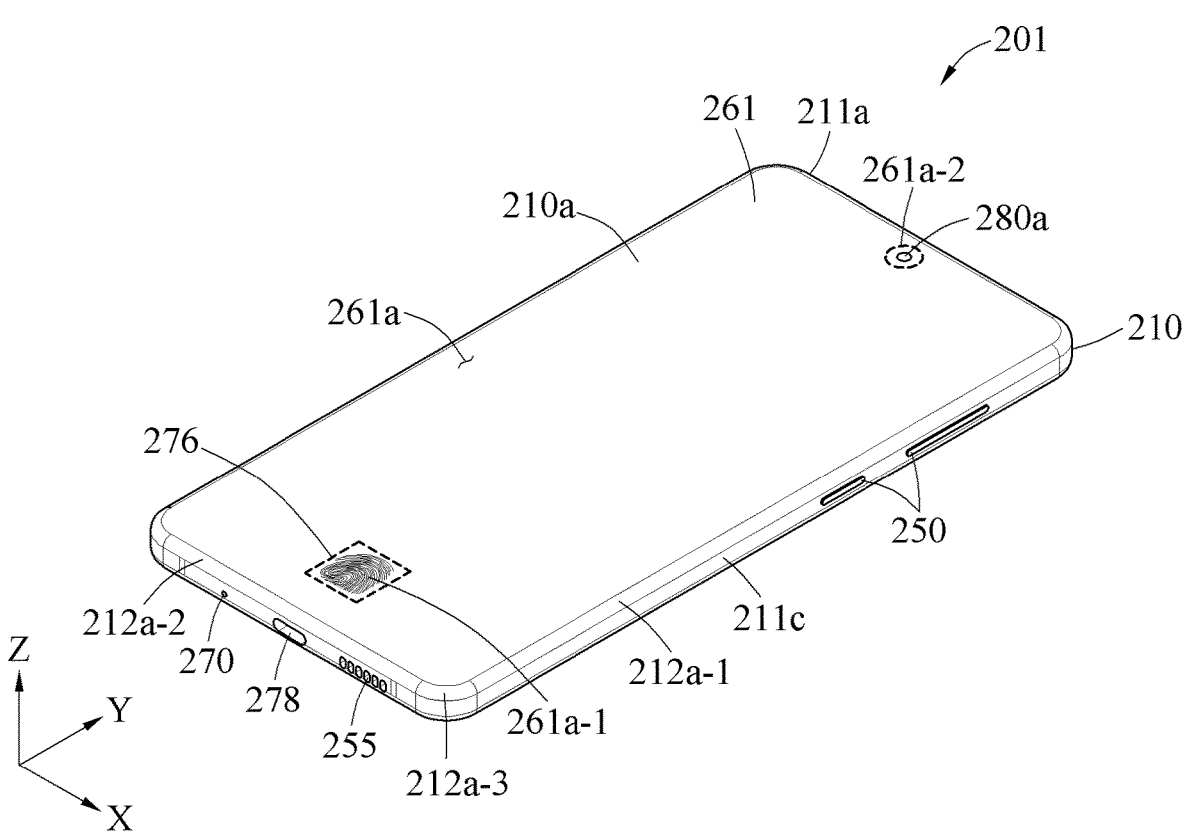
FIG. 2A is a front perspective view of an electronic device according to various embodiments.
Figure 2B:
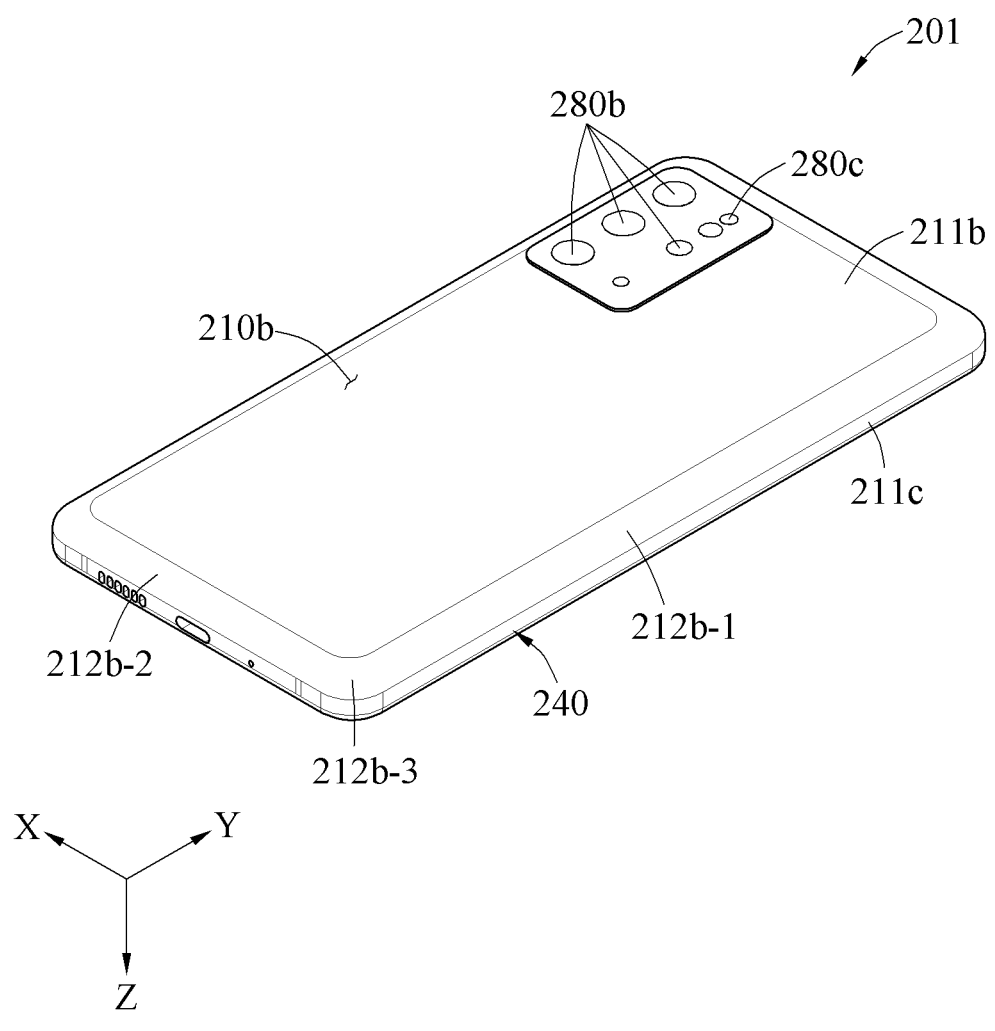
FIG. 2B is a rear perspective view of an electronic device according to various embodiments.
Figure 2C:
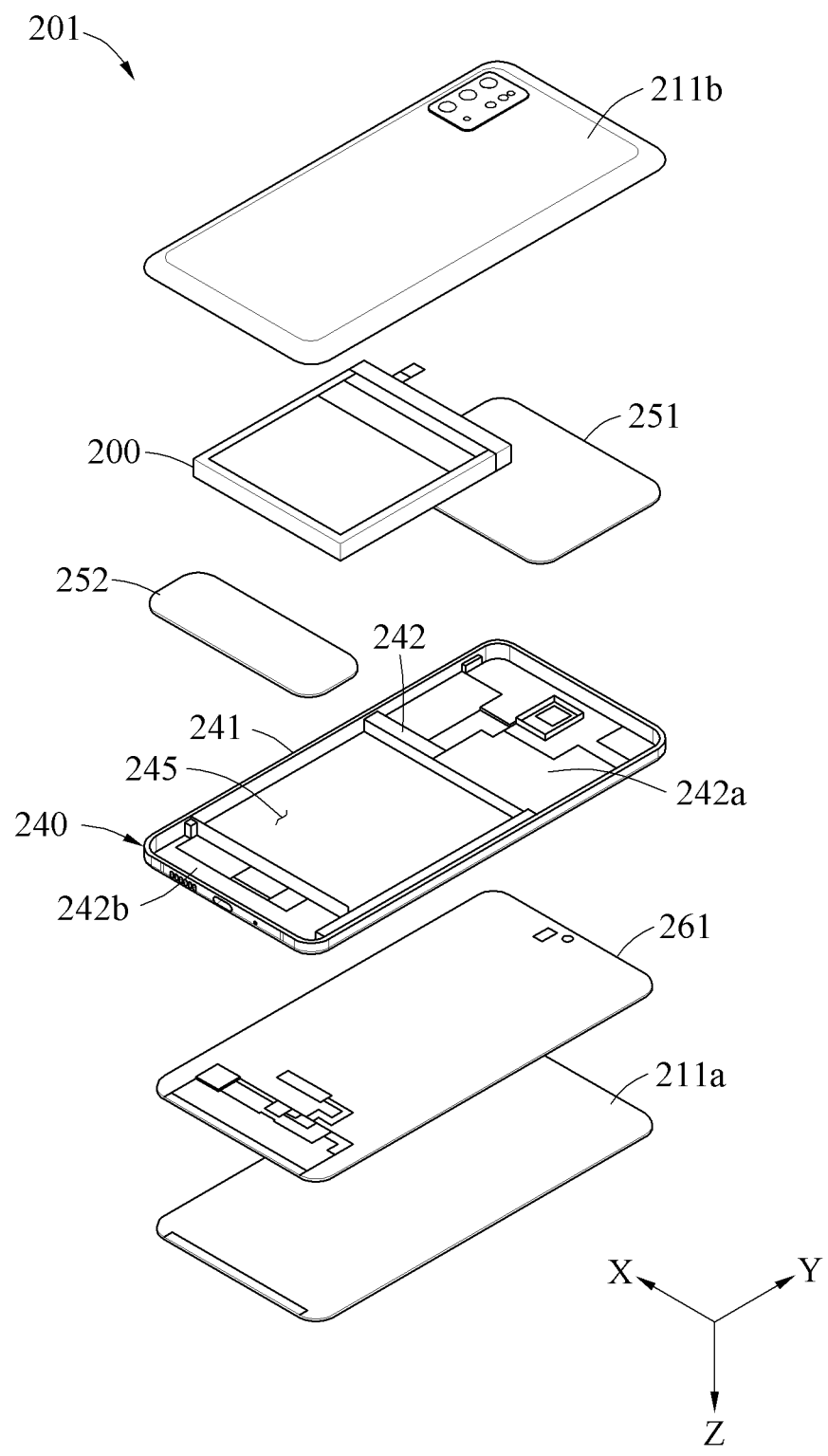
FIG. 2C is an exploded perspective view of an electronic device according to various embodiments.

FIG. 2A is a front perspective view of an electronic device according to various embodiments, FIG. 2B is a rear perspective view of an electronic device according to various embodiments, and FIG. 2C is an exploded perspective view of an electronic device according to various embodiments.

Referring to FIGS. 2A, 2B, and 2C, according to an example embodiment, an electronic device 201 (e.g., the electronic device 101 of FIG. 1) may include a housing 210 having a front surface 210a (or a first surface), a rear surface 210b (or a second surface), and a side surface 211c (or a third surface) surrounding an internal space between the front surface 210a and the rear surface 210b.

The front surface 210a may be formed with a first plate 211a of which at least a portion is substantially transparent. The first plate 211a may include, for example, a glass plate or polymer plate including at least one coating layer. The rear surface 210b may be formed with a second plate 211b that is substantially opaque. The second plate 211b may be formed by, for example, coated or colored glass, ceramics, metal (e.g., aluminum, stainless steel, or magnesium), or a combination thereof. The side surface 211c may be connected to the first plate 211a and the second plate 211b and be formed by a side member 240 including metal and/or polymer. The second plate 211b and the side member 240 may be integrated seamlessly. The second plate 211b and the side member 240 may be formed with substantially the same material (e.g., aluminum).

The first plate 211a may include a plurality of first edge areas 212a-1 rounded from at least an area of the front surface 210a toward the second plate 211b and extending in one direction (e.g., a +/−X-axis direction), a plurality of second edge areas 212a-2 rounded from at least an area of the front surface 210a toward the second plate 211b and extending in another direction (e.g., a +/−Y-axis direction), and a plurality of third edge areas 212a-3 rounded from at least an area of the front surface 210a toward the second plate 211b and disposed between the first edge areas 212a-1 and the second edge areas 212a-2.

The second plate 211b may include a plurality of fourth edge areas 212b-1 rounded from at least an area of the rear surface 210b toward the first plate 211a and extending in one direction (e.g., a +/−X-axis direction), a plurality of fifth edge areas 212b-2 rounded from at least an area of the rear surface 210b toward the first plate 211a and extending in another direction (e.g., a +/−Y-axis direction), and a plurality of sixth edge areas 212b-3 rounded from at least an area of the rear surface 210b toward the first plate 211a and disposed between the fourth edge areas 212b-1 and the fifth edge areas 212b-2.

The side member 240 may surround at least a portion of an internal space between the front surface 210a and the rear surface 210b. The side member 240 may include a first support structure 241 disposed on at least a portion of the side surface 211c and a second support structure 242 connected to the first support structure 241 and forming an arrangement space in which components of the electronic device 201 are disposed. The first support structure 241 may form the side surface 211c of the housing 210 by connecting an edge of the first plate 211a and an edge of the second plate 211b and surrounding a space between the first plate 211a and the second plate 211b. The second support structure 242 may be disposed in an internal portion (or a body portion) of the electronic device 201. The second support structure 242 may be integrated with the first support structure 241, and separately formed to be connected to the first support structure 241. In the second support structure 242, printed circuit boards (PCBs) 251 and 252 may be disposed. For example, the second support structure 242 may be connected to a ground of the PCBs 251 and 252. On one surface (e.g., a lower surface (a surface in a +Z-axis direction) of FIG. 2C) of the second support structure 242, a display 261 may be disposed. On another surface (e.g., an upper surface (a surface in a −Z-axis direction) of FIG. 2C) of the second support structure 242, the second plate 211*b* may be disposed.

At least a portion of the side member 240 may be formed with a conductive material. For example, the first support structure 241 may be formed with metal and/or a conductive polymer material. For example, similar to the first support structure 241, the second support structure 242 may be formed with metal and/or a conductive polymer material.

The electronic device 201 may include the display 261 (e.g., the display module 160 of FIG. 1). The display 261 may be disposed on the front surface 210*a*. The display 261 may be exposed through at least a portion of the first plate 211*a*, for example, the first edge areas 212*a*-1, the second edge areas 212*a*-2, and the third edge areas 212*a*-3. The display 261 may have a shape substantially the same as a shape of an outer edge of the first plate 211*a*. According to some example embodiments, an edge of the display 261 may be substantially matched to the outer edge of the first plate 211*a*. The display 261 may include a touch sensing circuit, a pressure sensor configured to sense an intensity (pressure) of a touch, and/or a digitizer configured to sense a magnetic stylus pen.

The display 261 may include a screen displaying area 261*a* visually exposed, on which contents are displayed through pixels or cells. The screen displaying area 261*a* may include a sensing area 261*a*-1 and a camera area 261*a*-2. In this case, the sensing area 261*a*-1 may overlap at least a portion of the screen displaying area 261*a*. The sensing area 261*a*-1 may allow transmission of an input signal associated with a sensor module 276 (e.g., the sensor module 176 of FIG. 1). The sensing area 261*a*-1 may display the contents in a similar way the screen display area 261*a* that does not overlap the sensing area 261*a*-1 displays the contents. For example, while the sensor module 276 is not operating, the sensing area 261*a*-1 may display the contents. The camera area 261*a*-2 may overlap at least a portion of the screen displaying area 261*a*. The camera area 261*a*-2 may allow transmission of an optical signal associated with first camera modules 280*a* (e.g., the camera module 180 of FIG. 1). The camera area 261*a*-2 may display the contents in a similar way the screen displaying area 261*a* that does not overlap the camera area 261*a*-2 displays the contents. For example, while the camera modules 280*a* are not operating, the camera area 261*a*-2 may display the contents.

The electronic device 201 may include an audio module 270 (e.g., the audio module 170 of FIG. 1). The audio module 270 may obtain sound from an outside of the electronic device 201. For example, the audio module 270 may be disposed on the side surface 211*c* of the housing 210. The audio module 270 may obtain sound through at least one hole.

The electronic device 201 may include the sensor module 276. The sensor module 276 may sense a signal applied to the electronic device 201. For example, the sensor module 276 may be disposed on the front surface 210*a* of the electronic device 201. The sensor module 276 may form the sensing area 261*a*-1 on at least a portion of the screen displaying area 261*a*. The sensor module 276 may receive an input signal transmitted through the sensing area 261*a*-1, and generate an electrical signal based on the received input signal. For example, the input signal may have set physical quantities (e.g., heat, light, temperature, sound, pressure, ultrasound). For another example, the input signal may include a signal associated with bioinformation of a user (e.g., fingerprints and voice of the user).

The electronic device 201 may include the camera modules 280*a* and 280*b* (e.g., the camera module 180 of FIG. 1). The camera modules 280*a* and 280*b* may include a first camera module 280*a*, a second camera module 280*b*, and a flash 280*c*. The first camera module 280*a* may be disposed to be exposed through the front surface 210*a* of the housing 210, and the second camera module 280*b* and the flash 280*c* may be disposed to be exposed through the rear surface 210*b* of the housing 210. At least a portion of the first camera module 280*a* may be disposed on the housing 210 to be covered by the display 261. The first camera module 280*a* may receive an optical signal transmitted through the camera area 261*a*-2. The second camera module 280*b* may include a plurality of cameras (e.g., a dual-lens camera, a triple-lens camera, or a quad-lens camera). The flash 280*c* may include a light-emitting diode (LED) or a xenon lamp.

The electronic device 201 may include a sound output module 255 (e.g., the sound output module 155 of FIG. 1). The sound output module 255 may output sound to the outside of the electronic device 201. For example, the sound output module 255 may output sound to the outside of the electronic device 201 through at least one hole formed on the side surface 211*c* of the housing 210.

The electronic device 201 may include an input module 250 (e.g., the input module 150 of FIG. 1). The input module 250 may receive a user control signal from the user. The input module 250 may include at least one key input device disposed to be exposed on the side surface 211*c* of the housing 210.

The electronic device 201 may include a connecting terminal 278 (e.g., the connecting terminal 178 of FIG. 1). The connecting terminal 278 may be disposed on the side surface 211*c*. For example, when the electronic device 201 is viewed in a direction (e.g., a +Y-axis direction of FIG. 2A), the connecting terminal 278 may be disposed in a central portion of the side surface 211*c*, and the sound output module 255 may be disposed in a direction (e.g., a right direction) from the connecting terminal 278.

The electronic device 201 may include the PCBs 251 and 252 and a battery 200 (e.g., the battery 189 of FIG. 1) that are disposed in the housing 210. The PCBs 251 and 252 may include a first PCB 251 and a second PCB 252. In this case, the first PCB 251 may be received in a first board slot 242*a* of the second support structure 242, and the second PCB 252 may be received in a second board slot 242*b* of the second support structure 242. The battery 200 may be received in a battery slot 245 of the second support structure 242 that is formed between the first board slot 242*a* and the second board slot 242*b*. The battery 200 may be electrically connected to the PCBs 251 and 252 to supply power to components provided on the PCBs 251 and 252.

Figure 3:
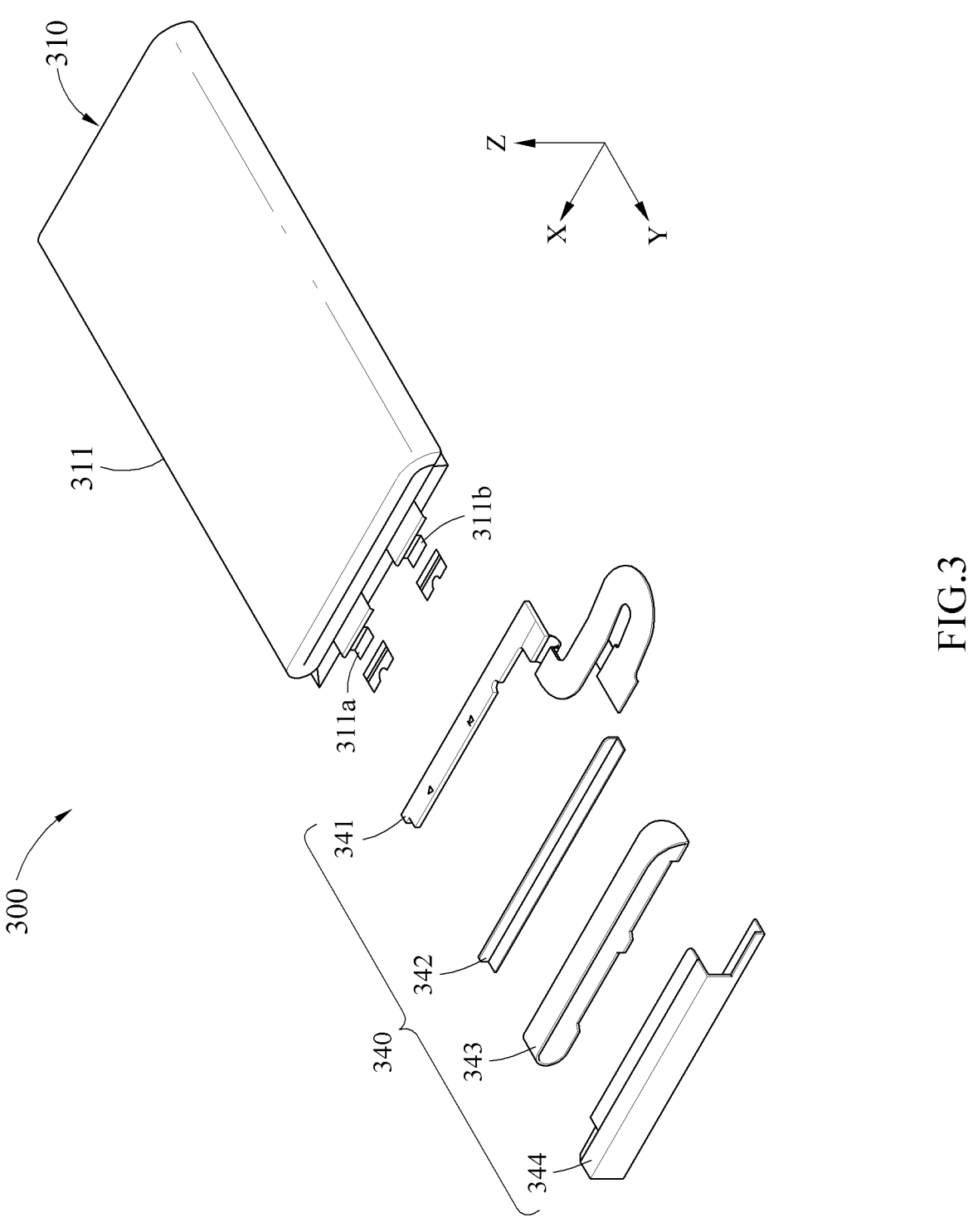
FIG. 3 is an exploded perspective view of a battery according to various embodiments.
Figure 4A:
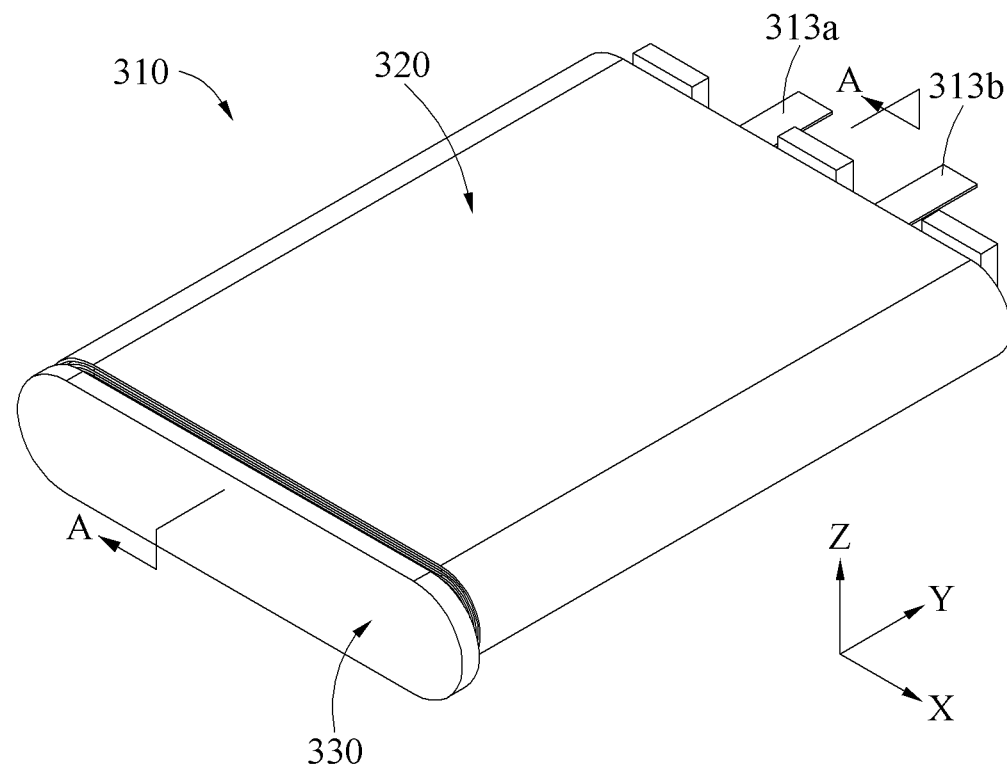
FIGS. 4A and 4B are front perspective views of an electrode assembly shown in both directions according to various embodiments.
Figure 4B:
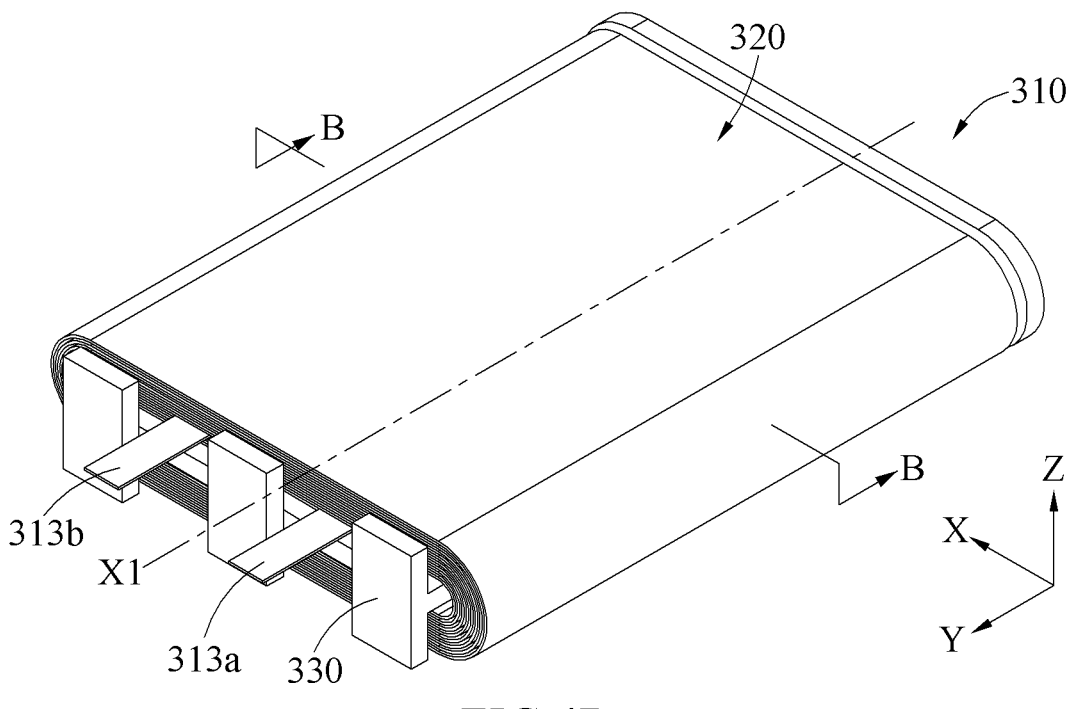
Figure 5A:
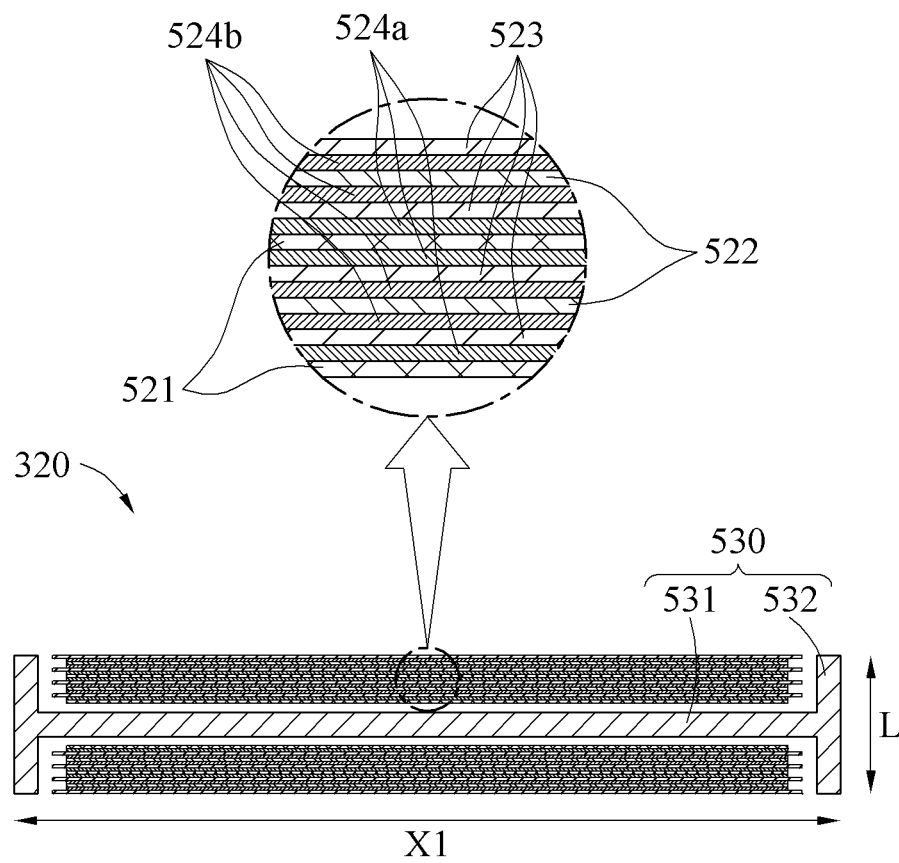
FIG. 5A is a cross-sectional view of the electrode assembly taken along line A-A of FIG. 4A according to various embodiments.
Figure 5A:
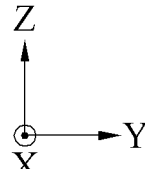
Figure 5B:
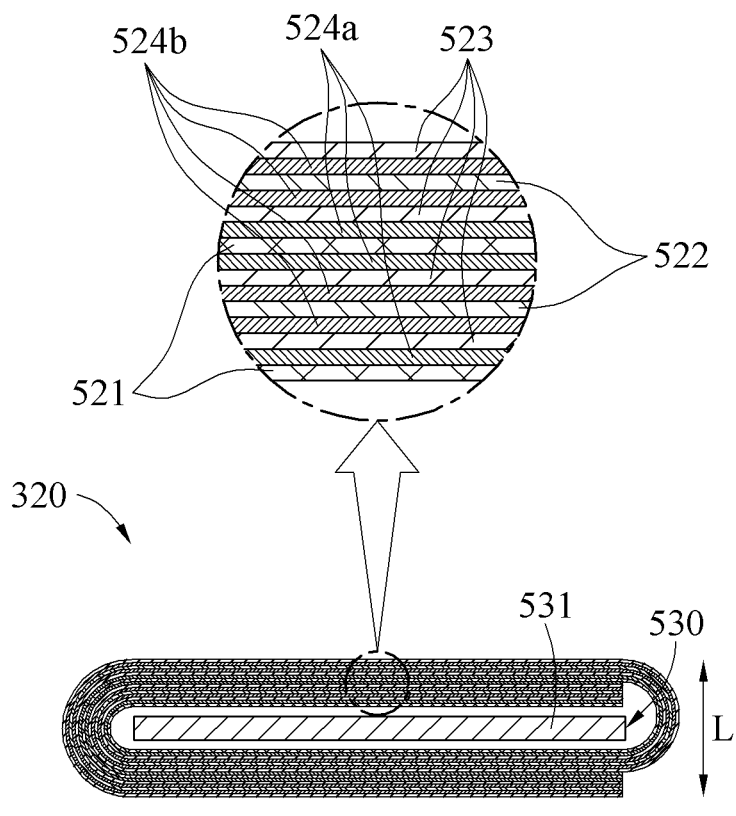
FIG. 5B is a cross-sectional view of the electrode assembly taken along line B-B of FIG. 4B according to various embodiments.
Figure 5B:
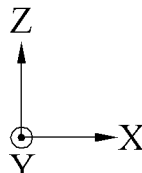
Figure 6A:
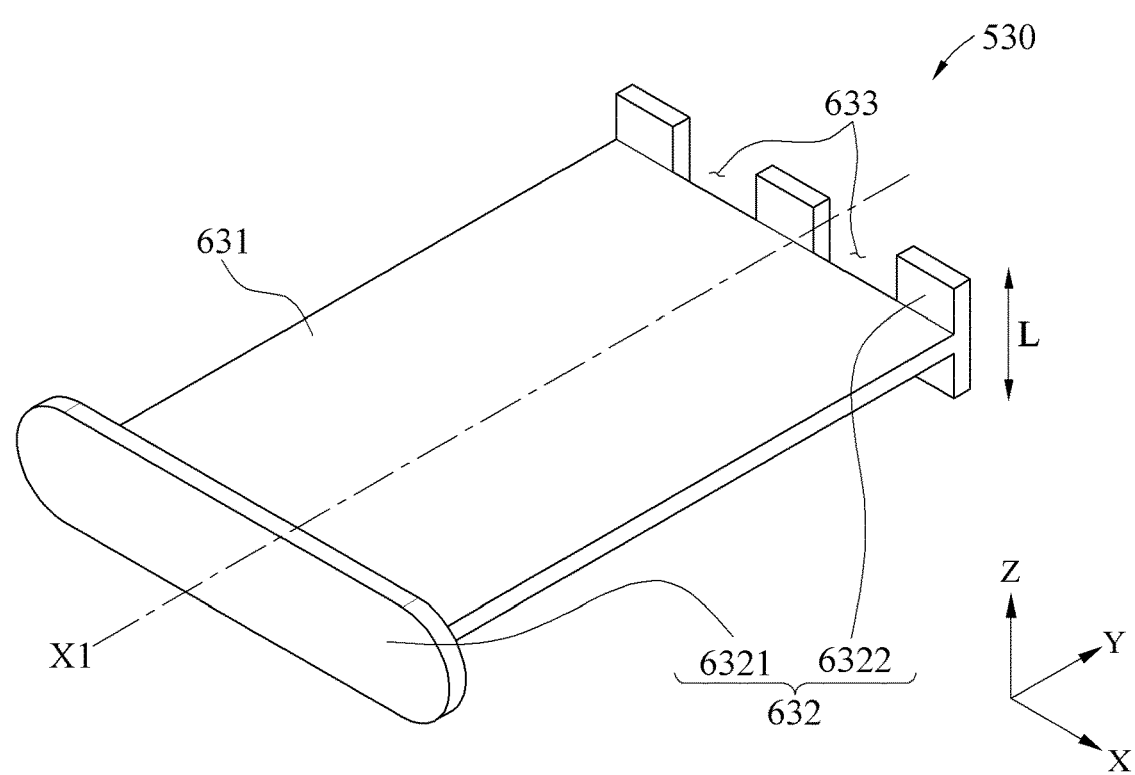
FIG. 6A is a perspective view of a protective frame with the electrode assembly omitted from FIG. 4A according to various embodiments.

FIG. 3 is an exploded perspective view of a battery according to various embodiments. FIGS. 4A and 4B are front perspective views of an electrode assembly shown in both directions according to various embodiments. FIG. 5A is a cross-sectional view of the electrode assembly taken along line A-A line of FIG. 4A according to various embodiments, and FIG. 5B is a cross-sectional view of the electrode assembly taken along line B-B of FIG. 4B according to various embodiments. FIG. 6A is a perspective view of a protective frame with the electrode assembly omitted from FIG. 4A according to various embodiments.

Referring to FIGS. 3, 4A and 4B, 5A and 5B, and 6A, a battery 300 (e.g., the battery 200 of FIG. 2C) may include a battery cell 310 and a protection circuit module (PCM) 340.

The battery cell 310 may include a pouch 311, an electrode assembly 320, an electrode lead (e.g., electrode leads 313a and 313b), and a protective frame 530.

The pouch 311 may form an exterior of the battery cell 310. To an outside of the pouch 311, conductive terminals 311a and 311b may be pulled out. In this case, the conductive terminals 311a and 311b may be electrically connected to a positive electrode substrate 521 and a negative electrode substrate 522 of the electrode assembly 320 accommodated in the pouch 311.

The PCM 340 may be electrically connected to the battery cell 310. The PCM 340 may be electrically connected to the conductive terminals 311a and 311b pulled out to the outside of the pouch 311. The PCM 340 may include a protection circuit 341. The protection circuit 341 may be received in a case 342. To the case 342, a coupling member 343 to be fixed to the pouch 311 and configured to reduce or minimize an impact and a closing member 344 connected to simultaneously cover outer surfaces of the case 342 and the pouch 311 may be connected.

The protection circuit 341 may include one or more circuit elements configured to electrically protect the battery cell 310 and a circuit board (e.g., a rigid board (or a PCB) on which the circuit elements are provided. The protection circuit 341 may be used to maintain a voltage within a constant range during charging and discharging of the battery cell 310. For example, the protection circuit 341 may control the battery cell 310 to operate under a stable voltage range, thereby preventing/reducing damage to the battery cell 310 and/or an electronic device.

The electrode assembly 320 may be accommodated inside the pouch 311. The electrode assembly 320 may include a plurality of substrates 521 and 522 that are stacked while being insulated through a separator 523, mixture layers 524a and 524b coated on a surface of the substrates 521 and 522, and electrode leads 313a and 313b.

The substrates 521 and 522 (e.g., a plurality of current collectors) may be stacked in a stacking direction L (e.g., a Z-axis direction of FIG. 4A). The substrates 521 and 522 may include at least one positive electrode substrate 521 and at least one negative electrode substrate 522 that form opposite electrodes. In this case, the number of positive electrode substrates 521 and the number of negative electrode substrates 522 may be the same.

Figure 8:
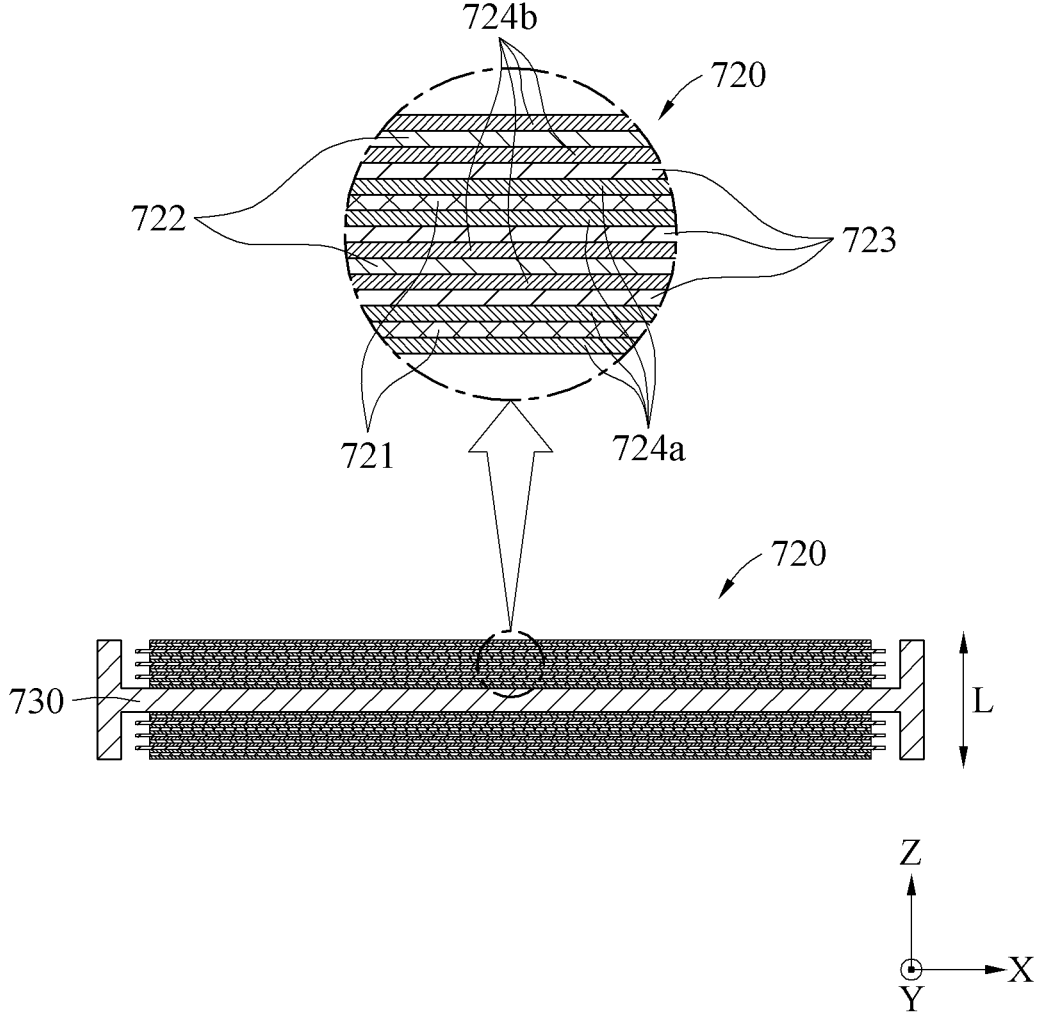
FIG. 8 is a cross-sectional view of an electrode assembly taken along line C-C of FIG. 7A according to various embodiments.

Although the electrode assembly 320 is illustrated as including one positive electrode substrate 521 and one negative electrode substrate 522, examples of the electrode assembly 320 are not limited to the illustrated example and the electrode assembly 320 may include a plurality of positive electrode substrates 521 and a plurality of negative electrode substrates 522. For example, the electrode assembly 320 may include four positive electrode substrates 521 and four negative electrode substrates 522 that are alternately stacked in a stacking direction L, as illustrated in FIG. 8.

The positive electrode substrate 521 and the negative electrode substrate 522 may be formed with different materials that are different in a standard redox potential. For example, the positive electrode substrate 521 may be formed with a highly conductive plate-shaped metal material, for example, stainless steel, aluminum, nickel, titan, or baked carbon. For example, the negative electrode substrate 522 may be formed with a highly conductive plate-shaped metal material, for example, copper, stainless steel, aluminum, nickel, titan, or baked carbon. For example, the positive electrode substrate 521 and the negative electrode substrate 522 may be formed with various materials, yet with different materials that are different in a redox potential to move electrons through a redox therebetween.

The substrates 521 and 522 may be stacked in a way that the positive electrode substrate 521 and the negative electrode substrate 522 are alternately stacked. For example, when the substrates 521 and 522 include a plurality of positive electrode substrates 521 and a plurality of negative electrode substrates 522, the positive electrode substrates 521 and the negative electrode substrates 522 may be alternately stacked in the stacking direction L. In this example, the positive electrode substrates 521 and the negative electrode substrates 522 may be stacked while being electrically insulated through the separator 523. The separator 523 may be disposed between the positive electrode substrate 521 and the negative electrode substrate 522 and block a direct contact between the positive electrode substrate 521 and the negative electrode substrate 522. In this case, a movement of electrons may be enabled between a neighboring positive electrode substrate 521 and a neighboring negative electrode substrate 522 that are disposed near each other. The separator 523 may be provided in a form of an insulating thin film with high ionic permeability and mechanical strength. For example, the separator 523 may include a sheet or nonwoven fabric formed of an olefin-based polymer (e.g., polypropylene), glass fiber, or polyethylene that is chemical-resistant and hydrophobic. The separator 523 may be formed to have a size of an area greater than that of the substrates 521 and 522 to stably block the contact between the positive electrode substrate 521 and the negative electrode substrate 522. For example, when viewed in the stacking direction L (e.g., from a +Z direction to a −Z direction), the separator 523 may be formed in a size that covers the entire area of the positive electrode substrate 521 and the negative electrode substrate 522.

The mixture layers 524a and 524b may be respectively applied to the surfaces of the substrates 521 and 522. The mixture layers 524a and 524b may be formed of a mixture of an active material, a conductive material, and a binder, or be formed with a further addition of a filler to the mixture. For example, a positive electrode mixture layer 524a applied to the surface of the positive electrode substrate 521 may include an oxide such as lithium cobalt oxide, lithium nickel oxide, lithium manganese oxide, lithium copper oxide, or lithium. For example, a negative electrode mixture layer 524b applied to the surface of the negative electrode substrate 522 may include, for example, non-graphitizing carbon, graphite-based carbon, lithium metal, lithium alloy, silicon-based alloy, or tin-based alloy.

The electrode assembly 320 may be wound around a first winding axis X1 perpendicular to the stacking direction L in which the substrates 521 and 522 are stacked. For example, the electrode assembly 320 may be formed in a roll type.

The electrode leads 313a and 313b may be used to connect the electrode assembly 320 to another component outside the pouch 311, for example, the PCM 340. The electrode leads 313a and 313b may be connected to the substrates 521 and 522 of the electrode assembly 320. For example, the electrode leads 313a and 313b may be electrically connected to a conductive terminal (e.g., the conductive terminals 311a and 311b) formed outside the pouch 311. The electrode leads 313a and 313b may include a first lead 313a connected to the positive electrode substrate 521 and a second lead 313b connected to the negative electrode substrate 522.

The protective frame 530 may protect the electrode assembly 320 from an external impact. The protective frame 530 may be received in the pouch 311 while being connected to the electrode assembly 320. The protective frame 530 may include a central portion 631 inserted in the electrode assembly 320, and a cover 632 connected to the central portion 631 and surrounding at least a portion of an outer surface of the electrode assembly 320.

The central portion 631 may be disposed inside the electrode assembly 320. For example, the central portion 631 may be disposed to cross an inside of the electrode assembly 320 in a direction (e.g., a Y-axis direction of FIG. 5A) perpendicular to the stacking direction L of the substrates 521 and 522. The central portion 631 may be provided in a form of a plate. In this case, an outer surface of the central portion 631 may be perpendicular to the stacking direction L of the substrates 521 and 522. For example, when the electrode assembly 320 is wound around a first winding axis X1 (e.g., a Y-axis direction) as illustrated in FIG. 4B, the central portion 631 may pass through a space between the substrates 521 and 522 in a direction of the first winding axis X1 to be inserted. In this example, the electrode assembly 320 may be formed by being wound along the outer surface of the central portion 631 around the first winding axis X1 of the central portion 631. A length in the direction of the first winding axis X1 of the central portion 631 may be greater than a length in the direction of the first winding axis X1 of the electrode assembly 320. For example, when viewed in the stacking direction L, both ends of the central portion 631 in the direction of the first winding axis X1 may be exposed to an outside of the electrode assembly 320.

The cover 632 may surround at least a portion of the outer surface of the electrode assembly 320. For example, with the electrode assembly 320 viewed in the stacking direction L, the cover 632 may be disposed on at least a portion of a perimeter of the electrode assembly 320. The cover 632 may be connected to an end of the central portion 631 exposed to the outside of the electrode assembly 320, and extend in a direction parallel to the stacking direction L to surround the outer surface of the electrode assembly 320. For example, when the electrode assembly 320 is provided in a roll type as illustrated in FIG. 4B, the cover 632 may be formed on at least one of both ends of the central portion 631 passing through the electrode assembly 320 in the direction of the first winding axis X1. For example, as illustrated in FIG. 6A, the cover 632 may include a first cover 6321 formed at one end of the central portion 631 and a second cover 6322 formed at another end of the central portion 631.

With the electrode assembly 320 viewed in the direction of the first winding axis X1, the cover 632 may cover the outer surface of the electrode assembly 320. For example, the cover 632 may cover an edge area of the substrates 521 and 522 and the separator 523 that form the electrode assembly 320. Such a structure may prevent/reduce the electrode assembly 320 from being damaged, deformed, and/or broken by an external impact, as the protective frame 530 covers the outer surface of the electrode assembly 320, for example, the edge area of the substrates 521 and 522 and the separator 523, through the cover 632.

When viewed in the direction of the first winding axis X1, the cover 632 may be formed to have substantially the same shape as a shape of the outer surface of the electrode assembly 320 or a shape overlapping the entire outer surface of the electrode assembly 320. For example, when the electrode assembly 320 has an oval side shape as illustrated in FIG. 5B, the cover 632 may be formed in an oval shape. When viewed in the direction of the first winding axis X1, the cover 632 may be formed to cover only at least a portion of the outer surface of the electrode assembly 320. For example, when the protective frame 530 includes a plurality of covers 632, for example, the first cover 6321 and the second covers 6322, the covers 632 may be formed in different shapes.

The protective frame 530 may include an outlet 633 through which the electrode leads 313a and 313b are pulled out. For example, the outlet 633 may be formed on the cover 632 that covers the outer surface of the electrode assembly 320. The outlet 633 may pass through the cover 632 to be formed. For example, when the electrode leads 313a and 313b are connected to the electrode assembly 320, a plurality of outlets 633 may be respectively formed on the covers 632 corresponding to respective positions of the electrode leads 313a and 313b.

In the protective frame 530, the central portion 631 and the cover 632 may be formed of the same material. For example, the protective frame 530 may be formed of a composite material including at least one of polyethylene terephthalate (PET) and polycarbonate (PC), for example.

FIGS. 6B, 6C, 6D and 6E (which may be referred to as FIGS. 6B through 6E) are perspective views of a protective frame according to various example embodiments. FIGS. 6B through 6E illustrate various examples of a protective frame, and the protective frame may be construed as being connected to an electrode assembly (e.g., the electrode assembly 320 of FIG. 4A) while being in a state illustrated in FIG. 6A unless otherwise stated. In addition, unless otherwise stated, the same names or terms described with reference to the accompanying drawings may be construed as indicating the same components.

Figure 6B:
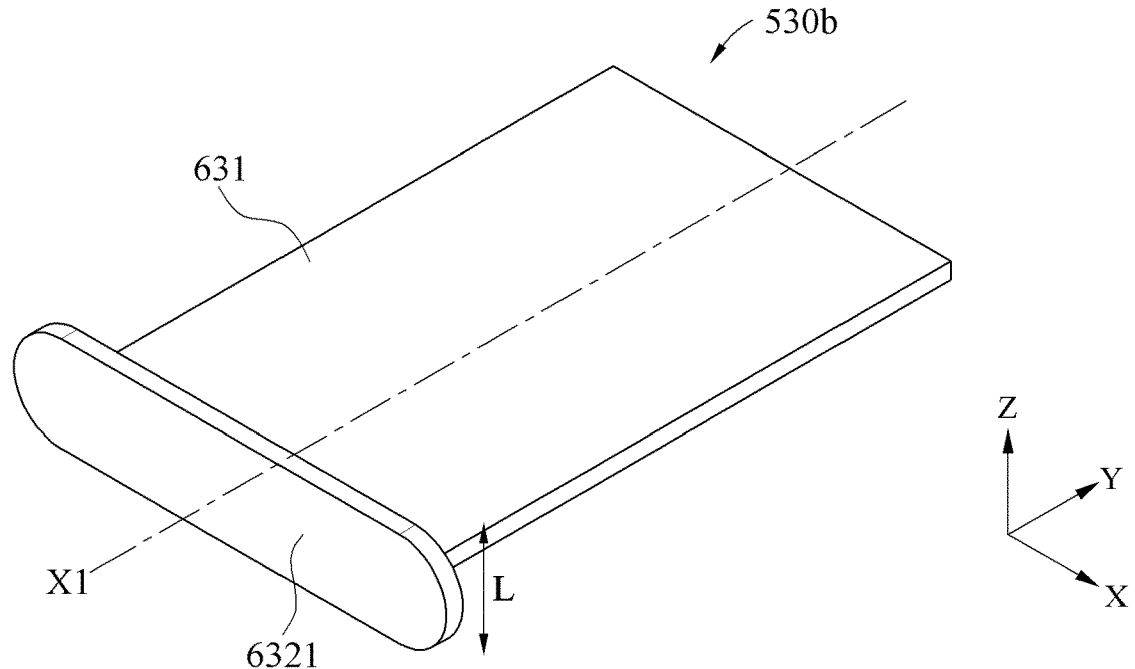
FIG. 6B is a perspective view of a protective frame according to various embodiments.

Referring to FIG. 6B, according to an example embodiment, a protective frame 530b may include a central portion 631 and a cover 6321 connected to the central portion 631. In this case, the protective frame 530b may include only one cover 6321 that is perpendicularly connected to an end of the central portion 631.

Figure 6C:
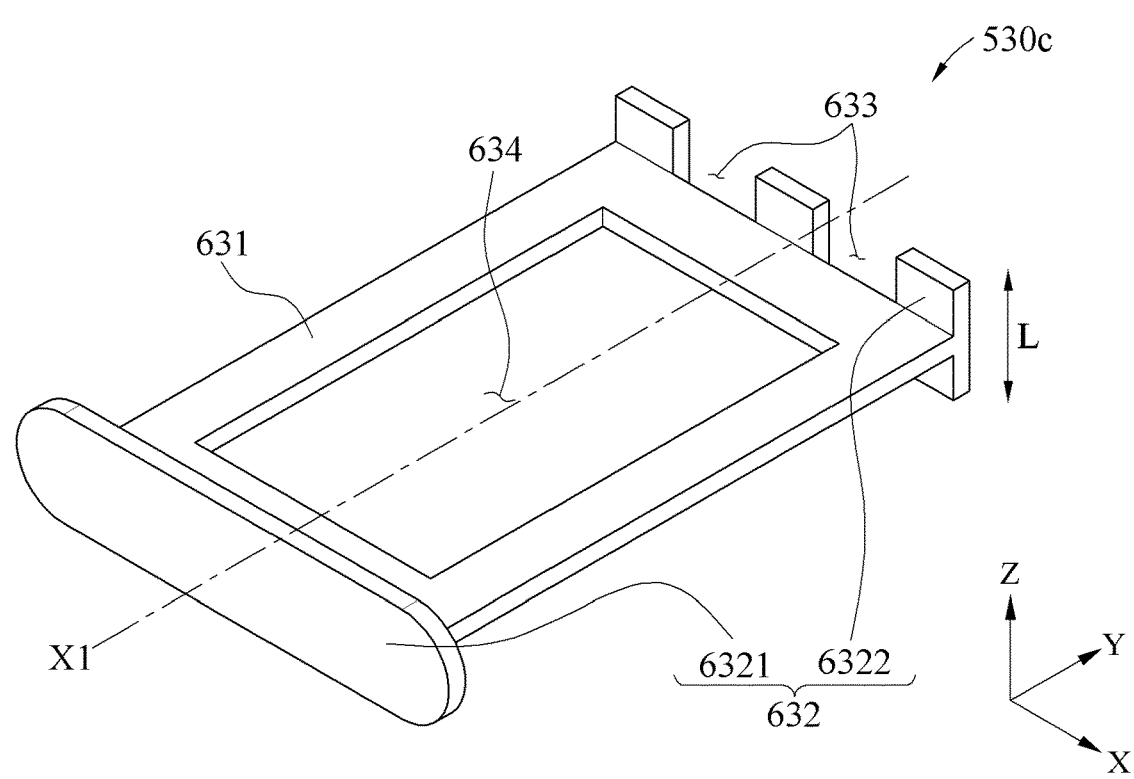
FIG. 6C is a perspective view of a protective frame according to various embodiments.

Referring to FIG. 6C, according to an example embodiment, a protective frame 530c may include a central portion 631 and a cover 632 perpendicularly connected to an end of the central portion 631. The cover 632 may include a first cover 6321 and a second cover 6322 perpendicularly connected to both ends (e.g., both ends in +/−Y-axis directions) of the central portion 631 that are opposite to each other. The second cover 6322 may have at least one outlet 633 through which the electrode leads 313a and 313b of the electrode assembly 320 are pulled out.

The protective frame 530c may include an open area 634 formed as at least a portion of the central portion 631 is removed to allow the open area 634 to pass through a surface of the central portion 631. In this case, with the surface of the central portion 631 viewed, the central portion 631 may have a form surrounding the open area 634. The open area 634 may form a hollow space to perform a function of reducing a pressure increase of a battery cell occurring by swelling. Swelling may refer to a phenomenon that a battery cell is swollen or inflated as an electrolyte (e.g., lithium ions) in the battery cell evaporates, and an open area (e.g., the open area 634) may form a space that collects gas generated inside the battery cell to perform a buffering function that prevents/reduces an increase in a volume of a battery.

Figure 6D:
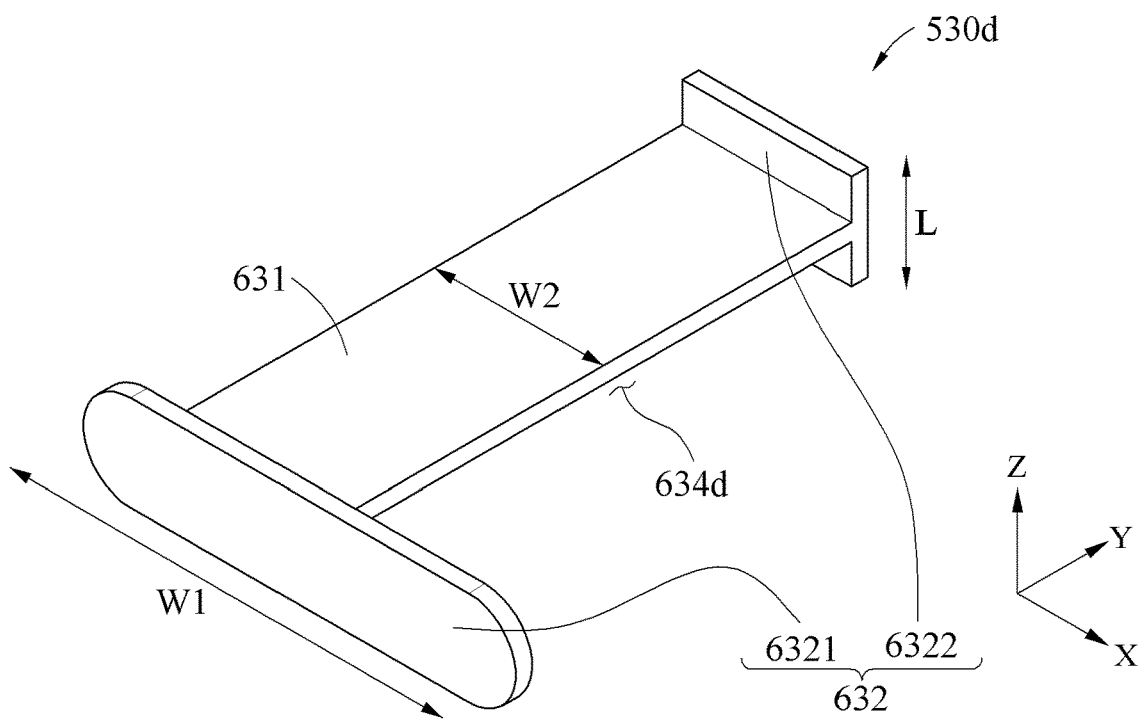
FIG. 6D is a perspective view of a protective frame according to various embodiments.

Referring to FIG. 6D, according to an example embodiment, a protective frame 530d may include a central portion 631 and at least one cover 632 perpendicularly connected to an end of the central portion 631. The cover 632 may include a first cover 6321 and a second cover 6322 perpendicularly connected to both ends of the central portion 631.

When viewed in a stacking direction (e.g., a Z-axis direction in FIG. 6D), for example, a direction perpendicular to the central portion 631, the central portion 631 may be formed in a size that covers only a portion of the electrode assembly 320, for example, a portion of substrates. For example, when the central portion 631 is inserted in a direction of a first winding axis (e.g., a Y-axis direction in FIG. 6D), a width of the central portion 631 perpendicular to the direction of the first winding axis (e.g., a width in an X-axis direction in FIG. 6D) may be less than a width of a substrate perpendicular to the direction of the first winding axis (e.g., a width in an X-axis direction in FIG. 4B). Such a structure may form a hollow space between substrates adjacent to both surfaces of the central portion 631 that does not overlap the central portion 631 with respect to the stacking direction, which may perform a function of buffering swelling of a battery cell.

When viewed in the stacking direction, at least one (e.g., the cover 6321) of the covers 6321 and 6322 connected to both ends of the central portion 631 may have a first width W1 corresponding to the width of the substrate. In this case, the central portion 631 may have a second width W2 less than that of the cover 6321.

Figure 6E:
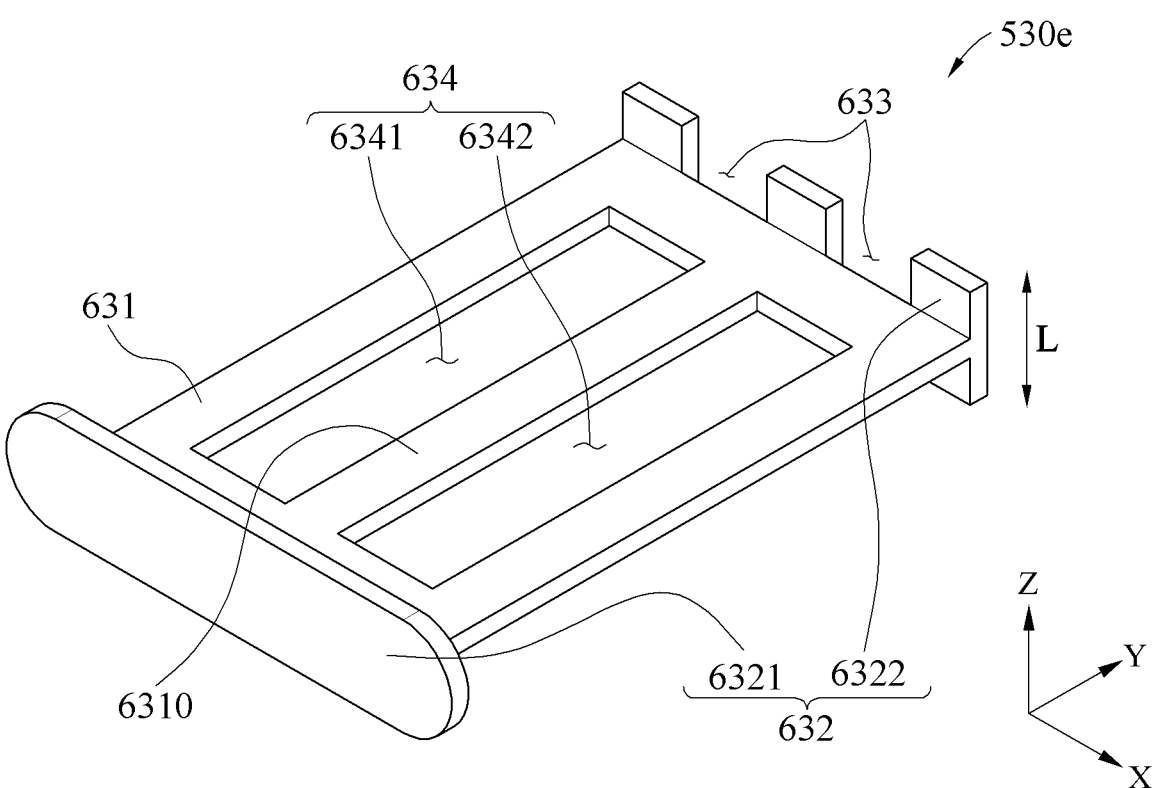
FIG. 6E is a perspective view of a protective frame according to various embodiments.

Referring to FIG. 6E, a protective frame 530e may include a central portion 631 and at least one cover 632 perpendicularly connected to both ends of the central portion 631. The cover 632 may include a first cover 6321 and a second cover 6322 respectively connected to both ends of the central portion 631 on opposite sides. The second cover 6322 may have an outlet 633 through which an electrode lead connected to an electrode assembly is pulled out.

The central portion 631 may have an open area 634 formed to collect gas generated by swelling of a battery cell. In this case, with the central portion 631 viewed in the stacking direction, the open area 634 may be divided into a plurality of areas. For example, the central portion 631 may include a connecting portion 6310 that crosses the central portion 631 to divide the open area 634. In this example, the open area 634 may be divided into a first open area 6341 and a second open area 6342 with respect to the connecting portion 6310. Such a structure may connect edges of the central portion 631 through the connecting portion 6310 and may thereby improve the rigidity of the central portion 631.

Figure 7A:
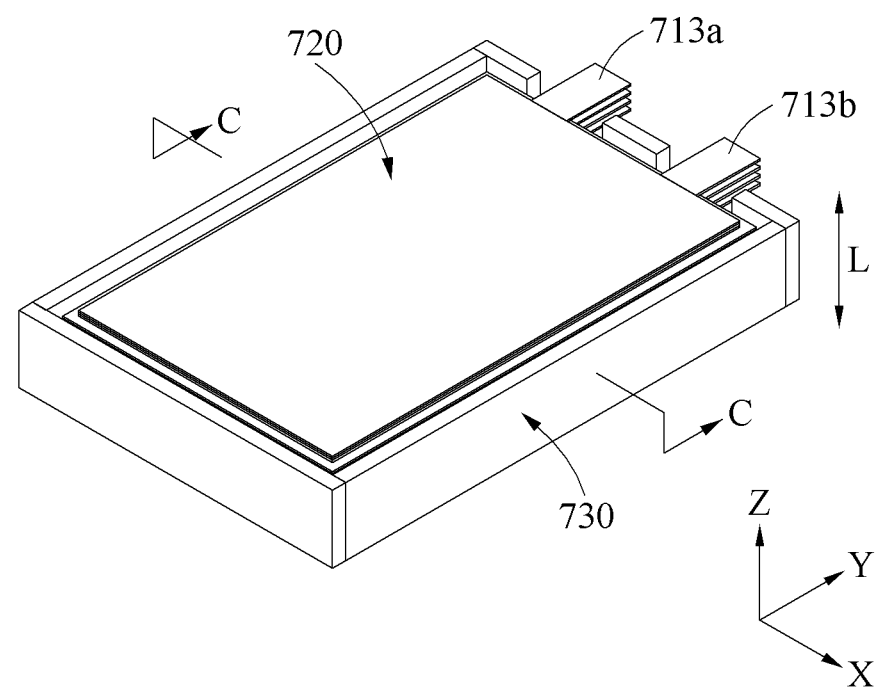
FIGS. 7A and 7B are front perspective views of an electrode assembly shown in both directions according to various embodiments.
Figure 7B:
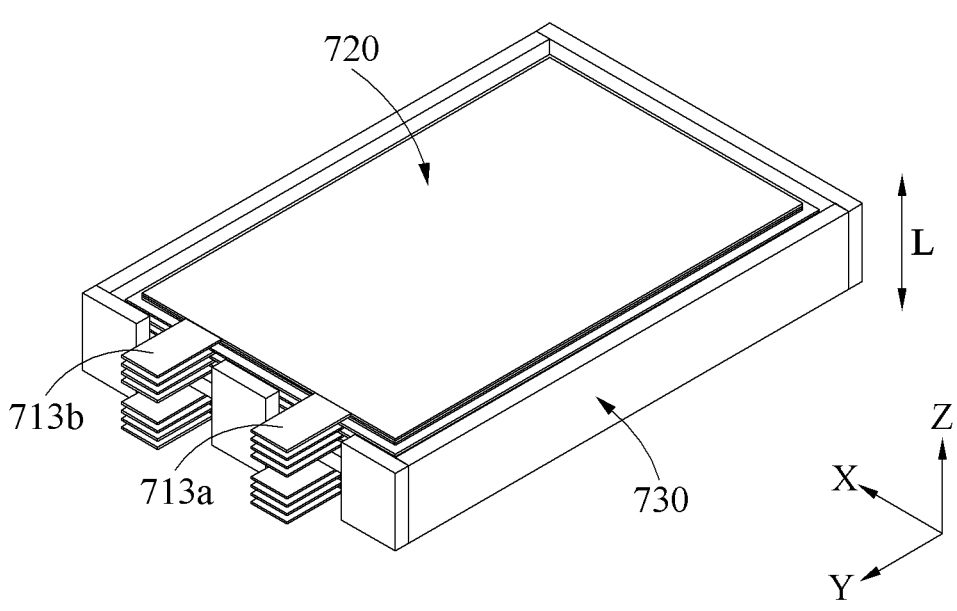
Figure 9A:
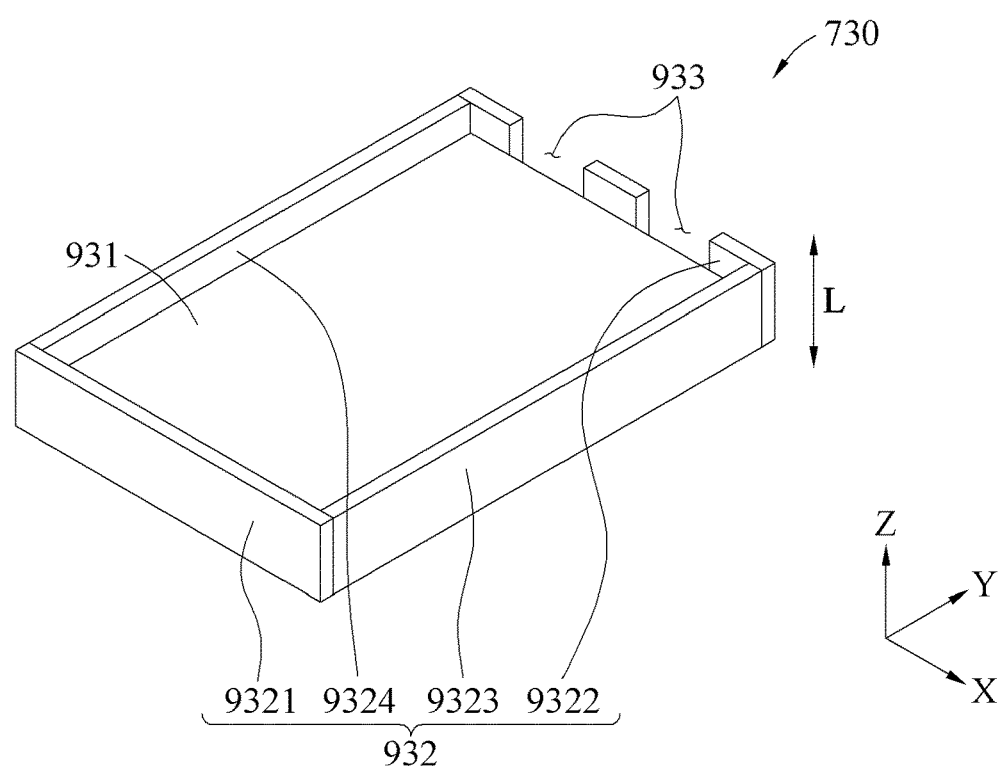
FIG. 9A is a perspective view of a protective frame according to various embodiments.
Figure 9B:
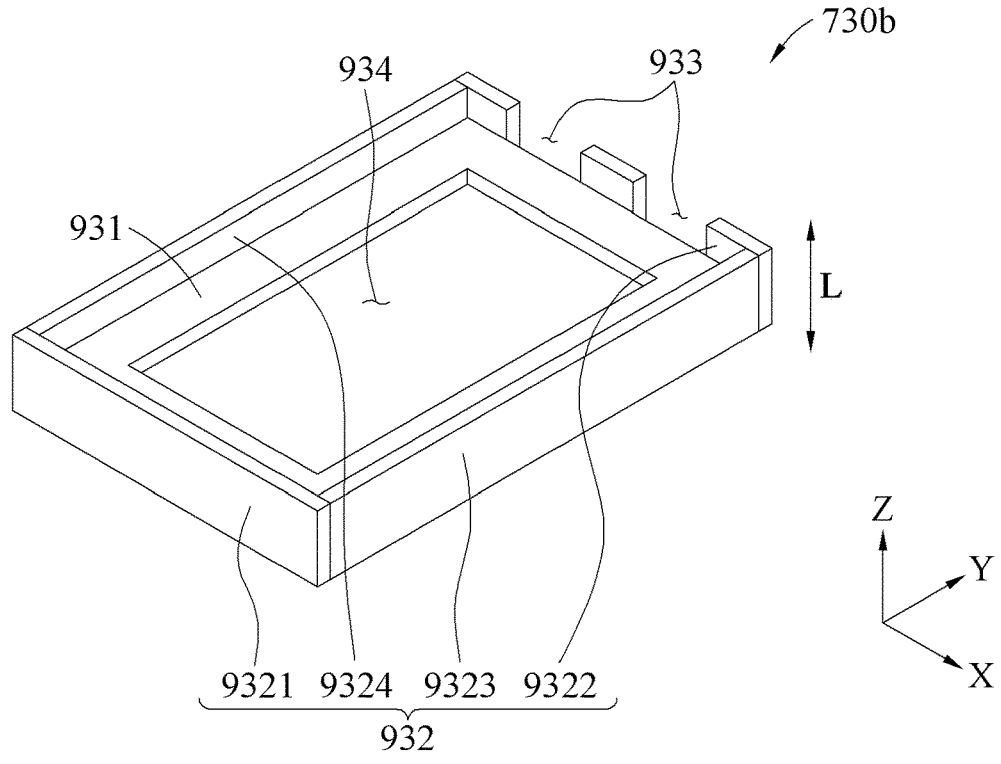
FIG. 9B is a perspective view of a protective frame according to various embodiments.

FIGS. 7A and 7B are front perspective views of an electrode assembly shown in both directions according to various embodiments. FIG. 8 is a cross-sectional view of the electrode assembly taken along line C-C of FIG. 7A according to various embodiments. FIG. 9A is a perspective view of a protective frame with the electrode assembly omitted from FIG. 7A according to various embodiments, and FIG. 9B is a perspective view of a protective frame with the electrode assembly omitted from FIG. 7A according to various embodiments.

Referring to FIGS. 7A and 7B, 8, and 9A, an electrode assembly 720 may include a plurality of substrates 721 and 722 stacked while being insulated through a separator 723, and a mixture layer 724a and 724b coated on a surface of each of the substrates 721 and 722. The substrates 721 and

722 may be stacked in a stacking direction L. The substrates 721 and 722 may include at least one positive electrode substrate 721 forming a positive electrode and at least one negative electrode substrate 722 forming a negative electrode. In this case, the positive electrode substrate 721 and the negative electrode substrate 722 may be alternately stacked in the stacking direction L. The electrode assembly 720 may be formed in a stack type that the positive electrode substrate 721 and the negative electrode substrate 722 are stacked in the stacking direction L. To the electrode assembly 720, electrode leads 713a and 713b may be connected for an electrical connection to other components.

A protective frame 730 may be connected to the electrode assembly 720 and cover an outer side of the electrode assembly 720. The protective frame 730 may include a central portion 931 crossing the electrode assembly 720 to be inserted therein in a direction perpendicular to the stacking direction L, and a cover 932 connected to an end of the central portion 931 and extending in the stacking direction L to cover a side surface of the electrode assembly 720.

The central portion 931 may be provided in a form of a plate and disposed between a pair of neighboring substrates 721 and 722. In this case, a surface of the central portion 931 may be perpendicular to the stacking direction L. For example, the central portion 931 may be disposed in parallel to the substrates 721 and 722. When viewed in the stacking direction L, the central portion 931 may be formed to have a greater size of an area than the electrode assembly 720. For example, the central portion 931 may be formed to have a size overlapping the entirety of the substrates 721 and 722 and the separator 723. When viewed in the stacking direction L, the central portion 931 may have a shape corresponding to that of the substrates 721 and 722. The substrates 721 and 722 may have a polygonal shape with respect to the stacking direction L, for example, a rectangular shape. In this case, the central portion 931 may be formed to have a polygonal shape corresponding to the substrates 721 and 722, for example, a rectangular shape having a greater size of an area than that of the substrates 721 and 722.

A cover 932 may be connected along a perimeter of the central portion 931. For example, when viewed in the stacking direction L, the cover 932 may be formed at an end of each of corners of the central portion 931. For example, when the central portion 931 has a rectangular shape as illustrated in FIG. 9A, the cover 932 may be formed at an end forming an each of four corners of the central portion 931. In this example, when the central portion 931 has the rectangular shape as illustrated in FIG. 9A, the cover 932 may include a first cover 9321, a second cover 9322, a third cover 9323, and a fourth cover 9324 that are connected to ends of the central portion 931. In this example, when viewed in the stacking direction L, the cover 932 may be connected along the perimeter of the central portion 931 to surround a perimeter of the electrode assembly 720.

The cover 932 may extend in both directions perpendicular to the central portion 931, for example, in the stacking direction L of the electrode assembly 720. With the electrode assembly 720 viewed in a direction perpendicular to the stacking direction L, an outer surface of the electrode assembly 720 may be covered by the cover 932. Based on a length in the stacking direction L, the cover 932 may be formed to have a length greater than or substantially equal to that of the electrode assembly 720.

Such a structure may cover an entire side surface of the electrode assembly 720 through the cover 932 when the electrode assembly 720 is formed in the stack type. Thus, the protective frame 730 may protect the electrode assembly

720 from an impact applied in a direction of the side surface of the electrode assembly 720, for example, an edge direction of the substrates 721 and 722 and the separator 723.

The cover 932 may have an outlet 933 through which the electrode leads 713a and 713b connected to the electrode assembly 720 are pulled out.

Referring to FIG. 9B, a protective frame 730b may include a central portion 931 inserted in an electrode assembly and a cover 932 connected to an end of the central portion 931 and covering an outer surface of the electrode assembly. For example, when the central portion 931 is formed in a quadrangular shape, the cover 932 may include a first cover 9321, a second cover 9322, a third cover 9323, and a fourth cover 9324 that are perpendicularly connected to respective ends forming corners of the central portion 931. At least one cover of the cover 932 may have an outlet 933 through which an electrode lead is pulled out.

The central portion 931 may have an opening 934 formed to collect gas generated by swelling of the electrode assembly. The opening 934 may be formed by passing through the central portion 931 in a perpendicular direction. The opening 934 may form a buffering space that buffers an increase in a volume of the electrode assembly.

Figures 10A, 10B:
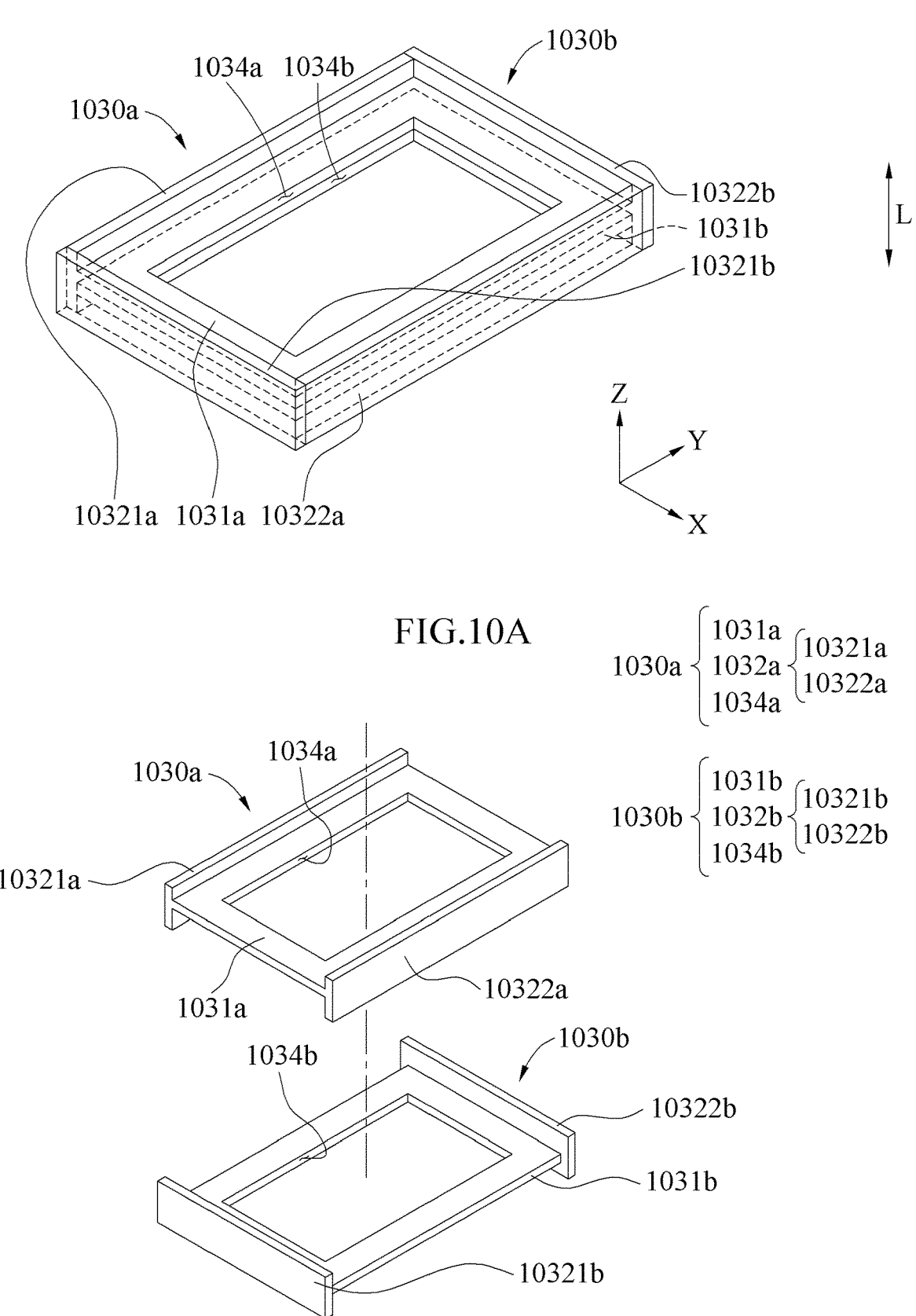
FIGS. 10A and 10B are perspective views of a protective frame according to various embodiments.

FIGS. 10A and 10B are perspective views of a protective frame according to various embodiments. The protective frame with the electrode assembly omitted from FIG. 7A is illustrated in FIGS. 10A and 10B.

Referring to FIGS. 10A and 10B, a plurality of protective frames 1030a and 1030b may be connected to an electrode assembly (e.g., the electrode assembly 720 of FIG. 7A). For example, a first protective frame 1030a and a second protective frame 1030b that are inserted in a direction perpendicular to a stacking direction L and in a direction perpendicular to each other may be connected to the electrode assembly. The first protective frame 1030a and the second protective frame 1030b may be connected separably from each other in the stacking direction L. For example, the first protective frame 1030a and the second protective frame 1030b may be connected to each other as illustrated in FIG. 10A and be separated from each other as illustrated in FIG. 10B.

The protective frames 1030a and 1030b may include central portions 1031a and 1031b each disposed between a pair of neighboring substrates, and covers 1032a and 1032b connected perpendicularly to respective ends of the central portions 1031a and 1031b and covering at least a portion of an outer surface of the electrode assembly. The respective central portions 1031a and 1031b of the protective frames 1030a and 1030b may be disposed in spaces between different substrates. The respective central portions 1031a and 1031b of the protective frames 1030a and 1030b may be disposed parallel to each other. When viewed in the stacking direction L, the central portions 1031a and 1031b of the protective frames 1030a and 1030b connected to the electrode assembly may be formed to have the same shape. The protective frames 1030a and 1030b may include open areas 1034a and 1034b formed in the central portions 1031a and 1031b, respectively. In this case, the open areas 1034a and 1034b formed in the central portions 1031a and 1031b may secure a buffer space for buffering the electrode assembly against swelling.

The covers 1032a and 1032b of the protective frames 1030a and 1030b may cover different portions of the outer surface of the electrode assembly. For example, as illustrated in FIGS. 10A and 10B, the first protective frame 1030a may include a first cover 10321a and a second cover 10322a respectively connected to both opposite ends of the central portion 1031a, and the second protective frame 1030b may include a third cover 10321b and a fourth cover 10322b respectively connected to both opposite ends of the central portion 1031b. For example, when the electrode assembly has a rectangular shape when viewed in a stacking direction as illustrated in FIG. 7A, the first cover 10321a, the second cover 10322a, the third cover 10321b, and the fourth cover 10322b may cover respective outer surfaces forming four corners of the electrode assembly.

Figure 11A:
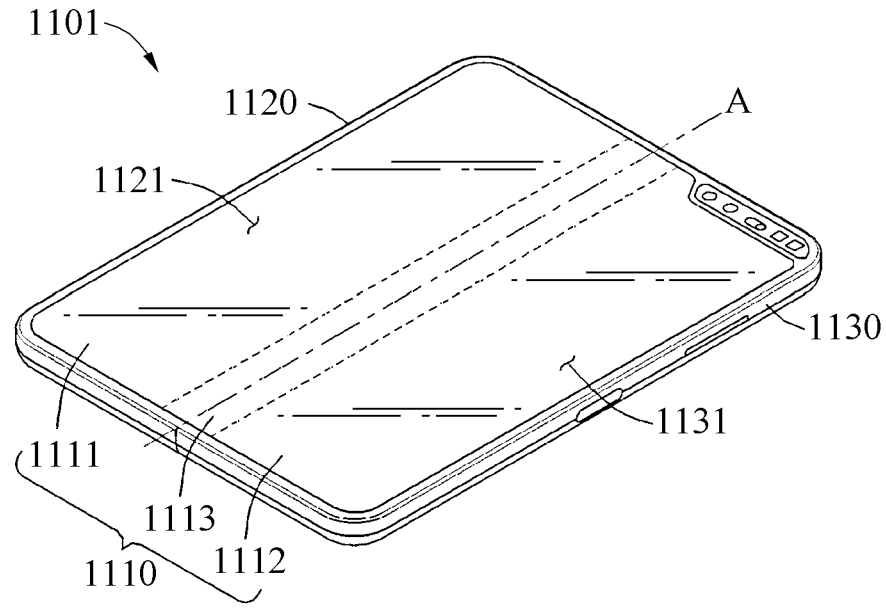
FIG. 11A is a perspective view of a foldable electronic device in an unfolded state according to various embodiments.
Figure 11B:
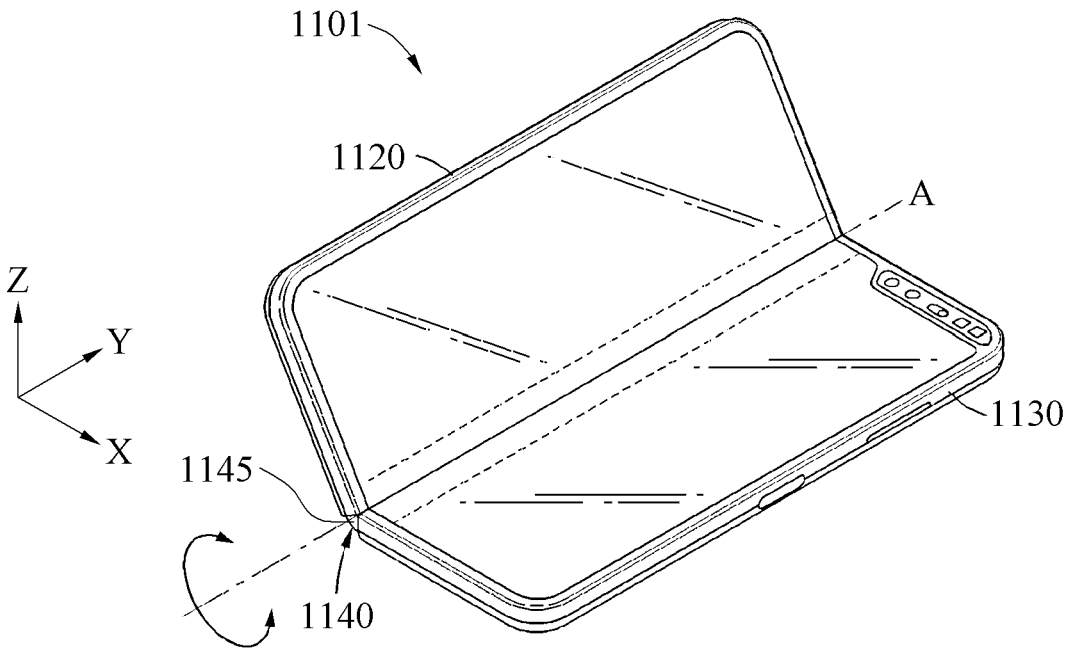
FIG. 11B is a perspective view of a foldable electronic device in a folded state according to various embodiments.
Figure 12:
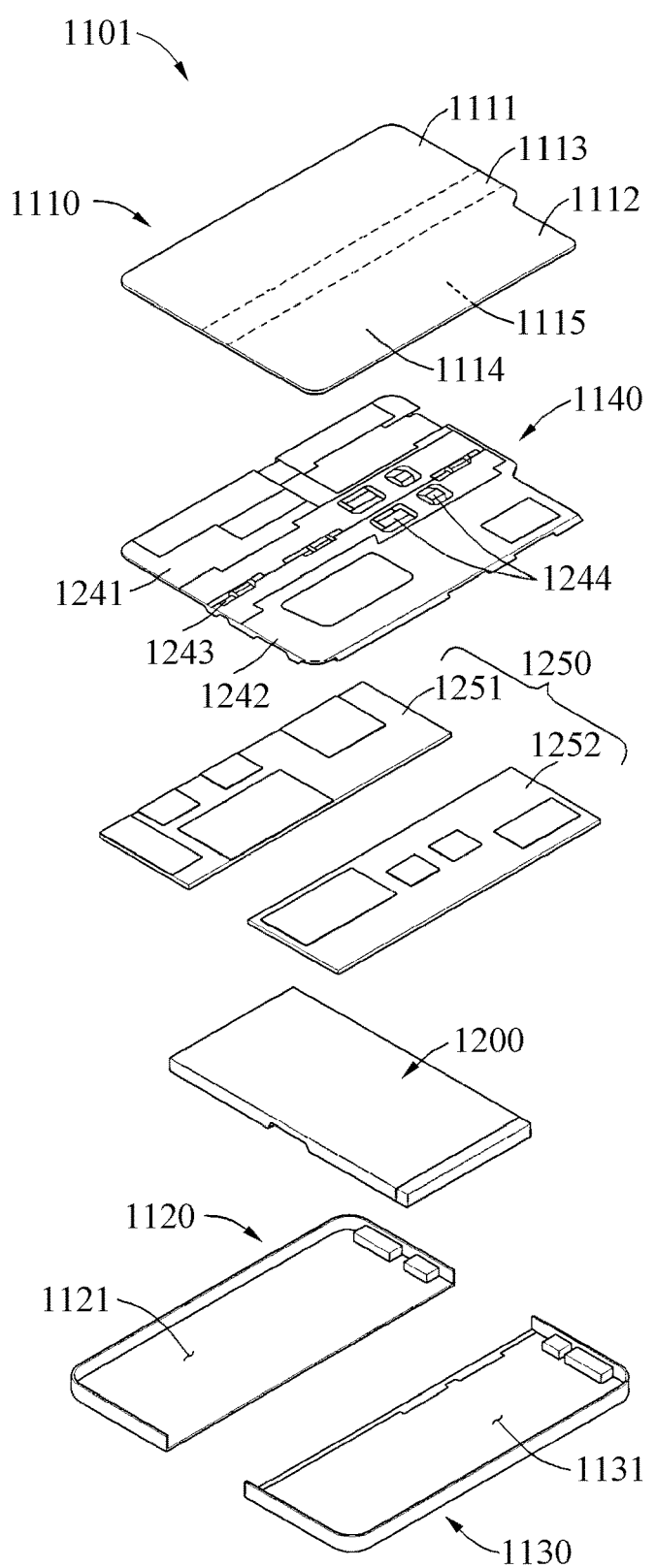
FIG. 12 is an exploded perspective view of a foldable electronic device according to various embodiments.
Figure 13:
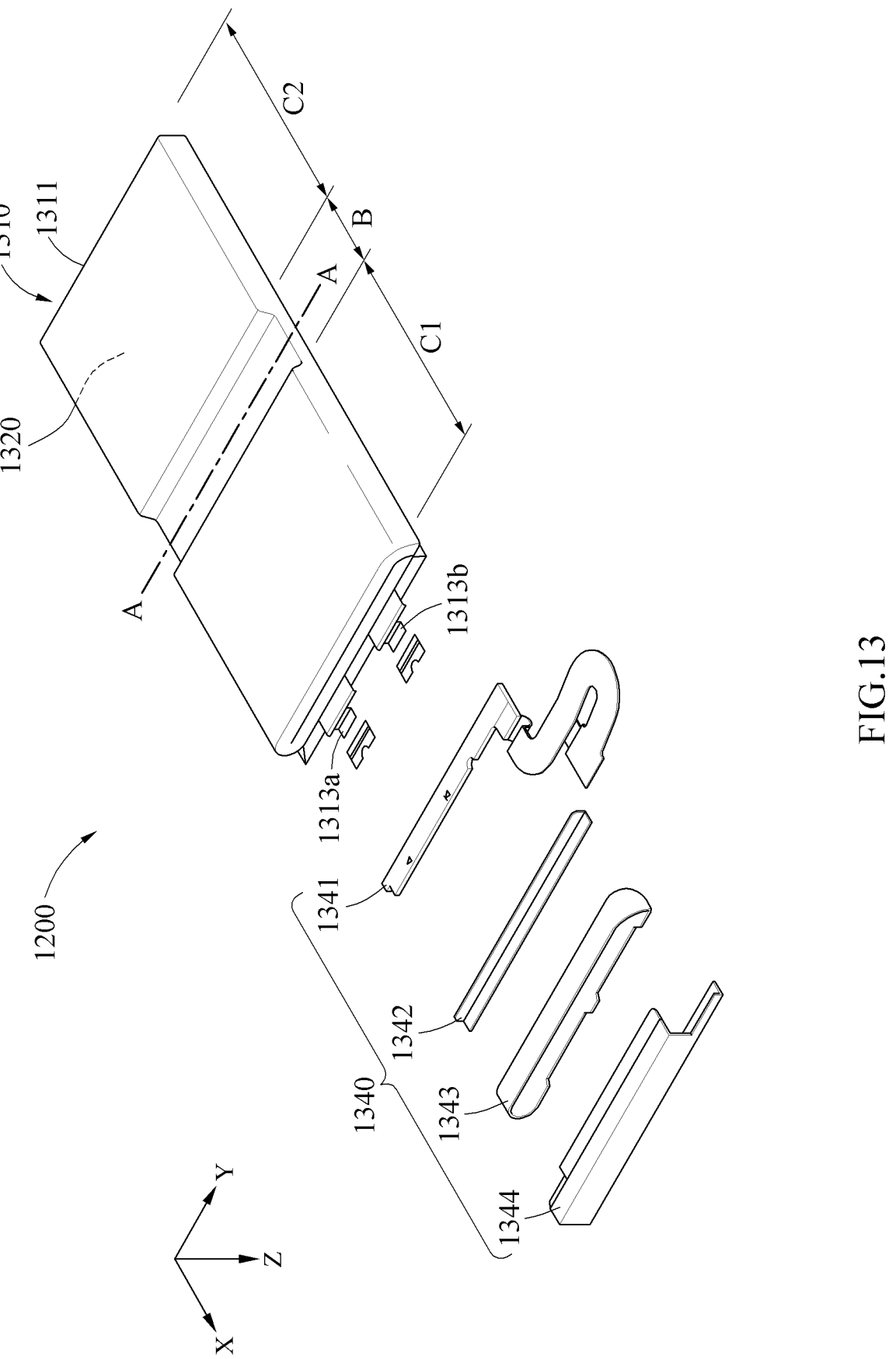
FIG. 13 is an exploded perspective view of a battery according to various embodiments.

FIG. 11A is a front perspective view of a foldable electronic device in an unfolded state according to various embodiments, and FIG. 11B is a perspective view of a foldable electronic device in a folded state according to various embodiments. FIG. 12 is an exploded perspective view of a foldable electronic device according to various embodiments. FIG. 13 is an exploded perspective view of a battery according to various embodiments.

Referring to FIGS. 11A and 11B, 12, and 13, according to various example embodiments, an electronic device 1101 (e.g., the electronic device 101 of FIG. 1) may have a form changed according to a state of use. For example, the electronic device 1101 may be provided in a foldable type that is selectively folded or unfolded according to a state of use. The electronic device 1101 may include a display 1110 (e.g., the display module 160 of FIG. 1), a first housing 1120, a second housing 1130, a support assembly 1140, a PCB 1250, and a battery 1200 (e.g., the battery 189 of FIG. 1). A surface on which the display 1110 is disposed may be defined as a front surface of the electronic device 1101, and an opposite surface of the front surface may be defined as a rear surface of the electronic device 1101. In addition, a surface surrounding a space between the front surface and the rear surface may be defined as a side surface of the electronic device 1101.

The display 1110 (e.g., the display module 160 of FIG. 1) may display visual information (e.g., texts and/or images) to a user. According to an example embodiment, the display 1110 may be deformed in its shape in response to a change in a shape (e.g., an opening/closing operation in FIGS. 11A and 11B). For example, at least a portion of the display 1110 may be deformed to be a flat surface or a curved surface. The display 1110 may include an axial area 1113 in which a folding axis A is disposed, a first area 1111 in which one side (e.g., a left side of the front surface) of the axial area 1113 is disposed, and a second area 1112 in which another side (e.g., a right side of the front surface) of the axial area 1113 is disposed. In this case, as an angle formed by the first area 1111 and the second area 1113 is adjusted through the axial area 1113, an overall shape of the display 1110 may be changed according to the opening/closing operation of the electronic device 1101. For example, the shape of the display 1110 may be changed to be in a first state (or an unfolded state in FIG. 11A) in which the first area 1111 and the second area 1112 form substantially the same plane, an intermediate state (or a state in FIG. 11B) in which the first area 1111 and the second area 1112 form a preset angle, or a second state (or a folded state) in which the first area 1111 and the second area 1112 face each other.

The first area 1111 and the second area 1112 may have an overall symmetrical shape with respect to the axial area 1113. However, the first area 1111 or the second area 1112 may include a notch area of which a portion is cut by another component (e.g., a camera, a sensor, etc.) exposed to the front surface of the electronic device 1101 and may thus have a partially asymmetrical shape.

The division of areas of the display 1110 described above may be provided as an example, and the display 1110 may be divided into a plurality of areas according to a required function and structure. For example, although the display 1110 is illustrated in FIGS. 11A and 11B as being divided into areas with respect to a folding axis A parallel to an Y axis or a central area, the display 1110 may also be divided into areas with respect to another folding axis A (e.g., a folding axis A parallel to an X axis) or another folding area B (e.g., a folding area B parallel to the X axis).

The display 1110 may include a display panel 1114 (e.g., a flexible display panel) and at least one plate 1115 or layer disposed on a rear surface of the display panel 1114.

The display panel 1114 may include a flexible display substrate, a plurality of display elements connected to the display substrate and forming a plurality of pixels, at least one conductive line connected to the display substrate and electrically connected to other display elements, and a thin-film pouch layer configured to prevent/reduce an inflow of oxygen and water (or moisture) from an outside. For example, a touch panel may be provided in or integrated with the display panel 1114.

The plate 1115 may support the rear surface of the display panel 1114 and may thereby improve the impact resistance of the display panel 1114. The plate 1115 may be disposed between the display panel 1114 and the support assembly 1140 to be described hereinafter, and may perform a function as a heat transfer path that transfers, to the display panel 1114, heat generated in an internal component (e.g., an application processor (AP)) of the electronic device 1101. The plate 1115 may be formed in a shape corresponding to that of the display panel 1115.

The first housing 1120 and the second housing 1130 may form an exterior of the electronic device 1101. The first housing 1120 and the second housing 1130 may be connected through a hinge structure 1243 to form the rear surface of the electronic device 1101. Each of the first housing 1120 and the second housing 1130 may include a front surface, a rear surface, and a side surface that covers a portion of a space between the front surface and the rear surface. In this case, the front surface may be formed as most areas thereof is open for the display 1110 to be exposed to an outside. However, a structure of the first housing 1120 and the second housing 1130 is not limited to a shape or connection illustrated in FIG. 12, but may be implemented by another shape or connection and/or combination of components. For example, although the side surface and the rear surface of each of the housings 1120 and 1130 are illustrated in FIG. 12 as being integrated, each of the housings 1120 and 1130 may have a member combined therewith or provided therein that covers the side surface and the rear surface, respectively.

The first housing 1120 and the second housing 1130 may fix and support internal components of the electronic device 1101. The first housing 1120 and the second housing 1130 may form a space in which at least one of the display 1110, the support assembly 1140, the PCB 1250, and the battery 1200 is seated, and fix and support the seated component. The display 1110 may be disposed in the first housing 1120 and the second housing 1130 to form a first space 1121 and a second space 1131, respectively. The first space 1121 and the second space 1131 may form a single space in which the display 1110 is seated through a connection of the first housing 1120 and the second housing 1130.

The support assembly 1140 may include a first support member 1241, a second support member 1242, the hinge structure 1243 disposed between the first support member 1241 and the second support member 1242, a hinge cover 1145 covering an outer surface of the hinge structure 1243, and a wiring member 1244 (e.g., a flexible PCB (FPCB)).

Any one of the first support member 1241 and the second support member 1242 may be disposed between the plate 1115 and the PCB 1250. For example, the first support member 1241 may be disposed between the first area 1111 and a first PCB 1251, and the second support member 1242 may be disposed between the second area 1112 and a second PCB 1252.

The hinge structure 1243 may foldably connect the first housing 1120 and the second housing 1130. By the hinge structure 1243, the first housing 1120 and the second housing 1130 may rotate with respect to the folding axis A. In this case, an angle formed between the first housing 1120 and the second housing 1130 may change according to a state of the electronic device 1101. The display 1110 may be disposed on the first housing 1120 and the second housing 1130, and may move accordingly as the first housing 1120 and the second housing 1130 are folded or unfolded. Thus, the shape of the electronic device 1101 may change through an operation of the hinge structure 1243.

For example, when the electronic device 1101 is in an unfolded state (or a flat state) (e.g., a state illustrated in FIG. 11A), the first housing 1120 and the second housing 1130 may be disposed to form an angle of 180 degrees (°) therebetween through the hinge structure 1243. In this example, the first area 1111 and the second area 1112 of the display 1110 may be disposed to face the same direction (e.g., a Z axis) to form a first state in which substantially the same plane is formed. The axial area 1113 may form the same plane as the first area 1111 and the second area 1112.

For example, when the electronic device 1101 is in a folded state, the first housing 1120 and the second housing 1130 may be disposed to face each other through the hinge structure 1243. In this example, the first area 1111 and the second area 1112 of the display 1110 may form a second state in which a narrow angle (e.g., in a range between 0° and 10°) is formed therebetween to face each other. In this example, the axial area 1113 may form a curved surface having a predetermined curvature.

For example, when the electronic device 1101 is in an intermediate state (e.g., a state illustrated in FIG. 11B), the first housing 1120 and the second housing 1130 may be disposed to form a predetermined angle through the hinge structure 1243. The first area 1111 and the second area 1112 of the display 1110 may form an angle that is greater than an angle formed in the folded state or less than an angle formed in the unfolded state. In this example, the axial area 1113 may form a curved surface having a curvature less than that in the folded state.

The hinge cover 1145 may cover the outer surface of the hinge structure 1243 to prevent/reduce the hinge structure 1243 from being exposed to the outside of the electronic device 1101. The hinge cover 1145 may be disposed between the first housing 1120 and the second housing 1130 and cover a space between the first housing 1120 and the second housing 1130. The hinge cover 1145 may be covered by the first housing 1120 and the second housing 1130 (for example, in the unfolded state) or exposed to the outside of the electronic device 1101 (for example, in the folded state) according to an operating state of the electronic device 1101.

The wiring member 1244 may perform a function of connecting parts or components disposed in the first space 1121 and the second space 1131. The wiring member 1244 may be disposed in a direction (e.g., an X-axis direction in FIG. 3) crossing the first support member 1241 and the second support member 1242.

To both sides of the support assembly 1140, the first housing 1120 and the second housing 1130 may be connected. For example, the support assembly 1140 may be disposed on a rear surface of the display 1110 and disposed in the first housing 1120 and the second housing 1130.

The PCB 1250 may include the first PCB 1251 disposed in the first housing 1120 or the second PCB 1252 disposed in the second housing 1130. The first PCB 1251 may be disposed in the first space 1121 formed by the first housing 1120, and the second PCB 1252 may be disposed in the second space 1131 formed by the second housing 1130. The PCB 1250 may have elements disposed therein to implement functions of the electronic device 1101.

The battery 1200 may supply power to the electronic device 1101. The battery 1200 may have a shape changing in response to a folding operation of the electronic device 1101. The battery 1200 may include a battery cell 1310 (e.g., the battery cell 310 of FIG. 4A), and a PCM 1340 connected to the battery cell 1310 and electrically connected to the PCB 1250.

The battery cell 1310 may be disposed to extend from the first space 1121 of the first housing 1120 to the second space 1131 of the second housing 1130. The battery cell 1310 may include a first cell area C1 disposed in the first space 1121, a second cell area C2 disposed in the second space 1131, and a folding area B foldably connecting the first cell area C1 and the second cell area C2. In this case, the folding area B may be disposed on a rear surface of the axial area 1131 of the display 1110 to cross the first area 1111 and the second area 1112. The folding area B may have a thickness less than that of the first cell area C1 and the second cell area C2 to reduce stress generated due to folding.

The battery cell 1310 may have a shape that changes in response to an operation of the electronic device 1101. In this case, an overall shape of the battery cell 1310 may be changed as the folding area B is folded or unfolded with respect to a folding axis A.

The battery cell 1310 may include a pouch 1311 forming an exterior of the battery cell 1310. An electrode assembly 1320 may be accommodated inside the pouch 1311, and conductive terminals 1313a and 1313b electrically connected to the electrode assembly 1320 may be pulled outside the pouch 1311.

The PCM 1340 may be electrically connected to the conductive terminals 1313a and 1313b pulled out to an outer surface of the pouch 1311. The PCM 1340 may include a protection circuit 1341. The protection circuit 1341 may be received in a case 1342. The case 1342 may be connected to a coupling member 1343 fixed to the pouch 1311 and configured to reduce an impact and a closing member 1344 connected to simultaneously cover the case 1342 and the outer surface of the pouch 1311.

Figure 14A:
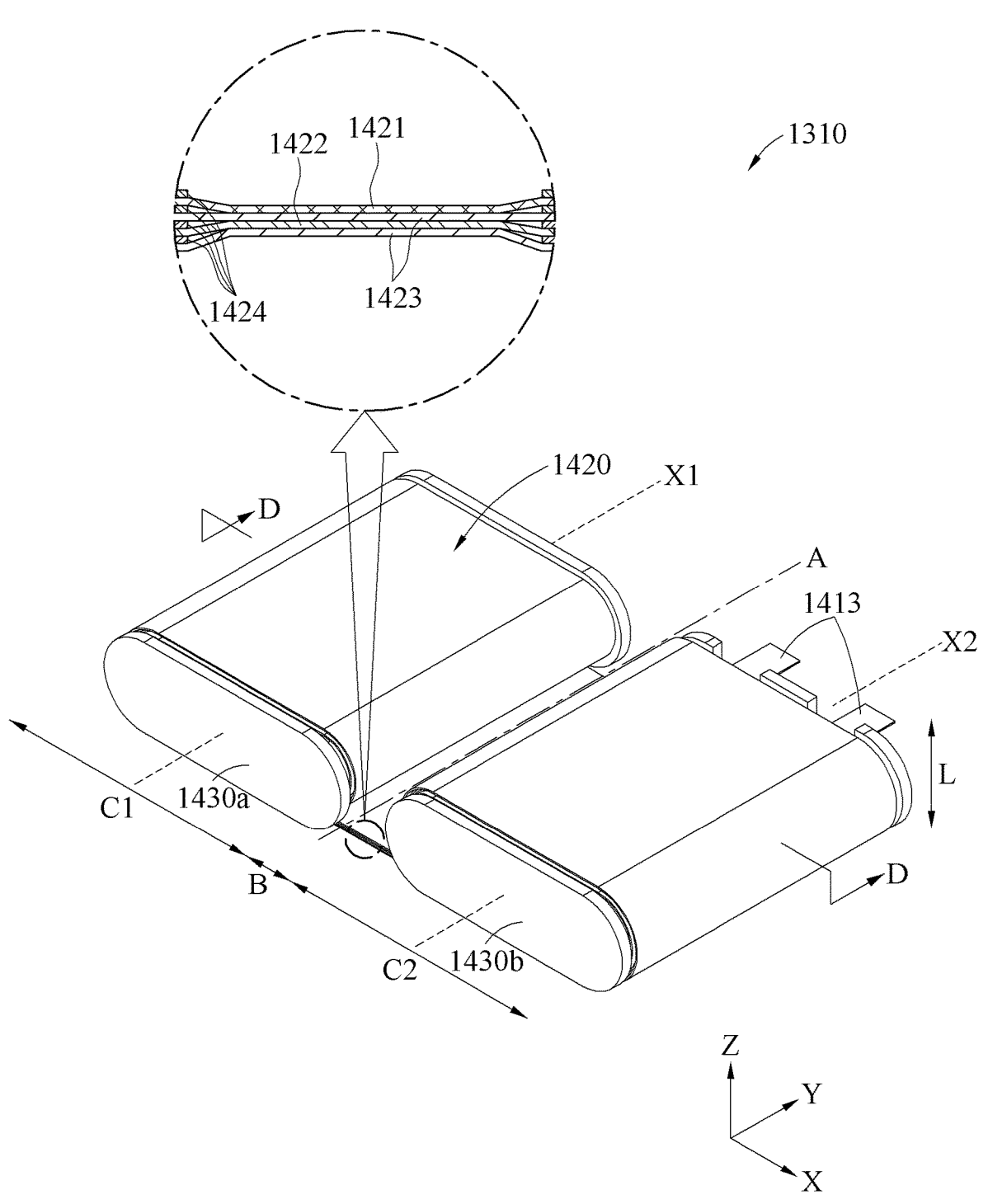
FIG. 14A is a perspective view of an electrode assembly according to various embodiments.
Figure 14B:
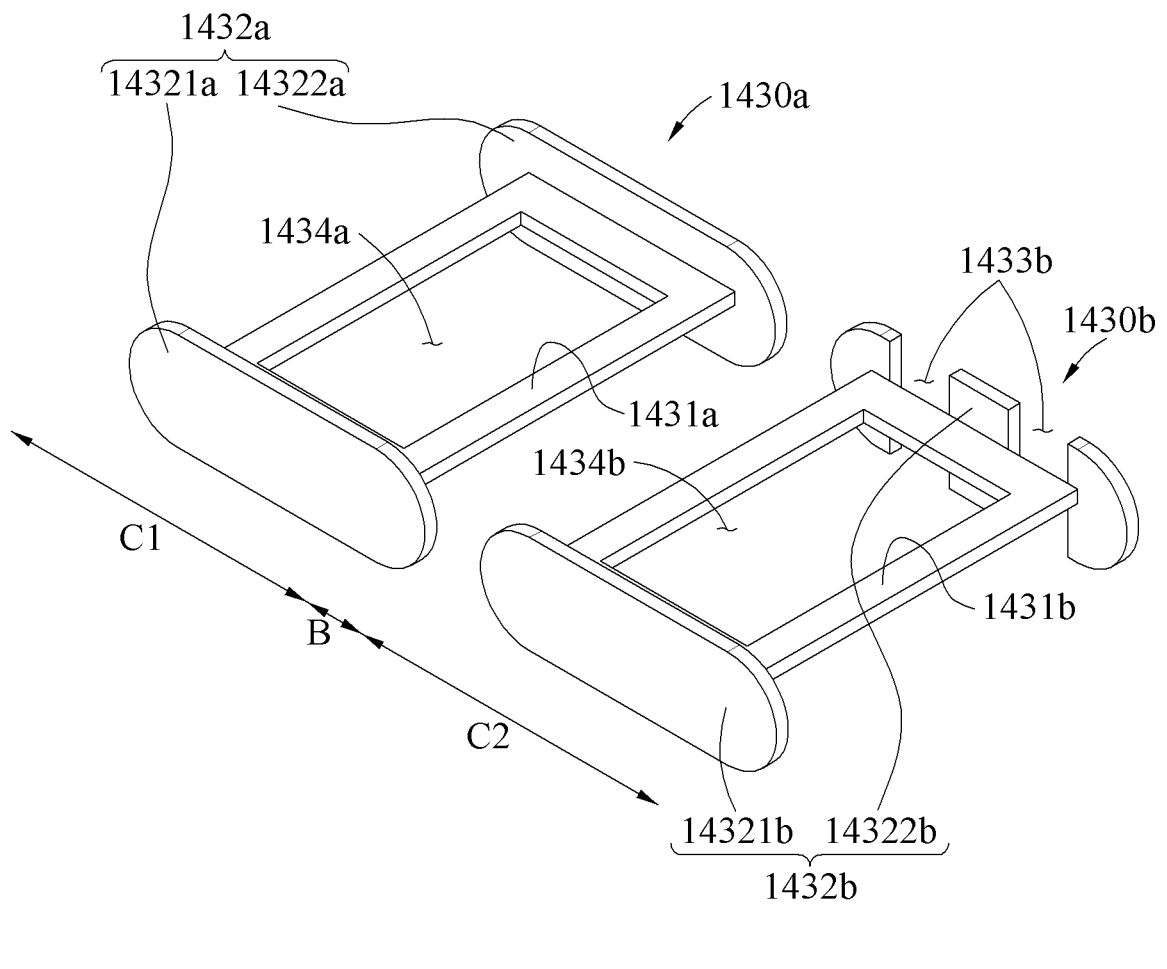
FIG. 14B is a perspective view of a protective frame with the electrode assembly omitted from FIG. 14A according to various embodiments.
Figure 14C:
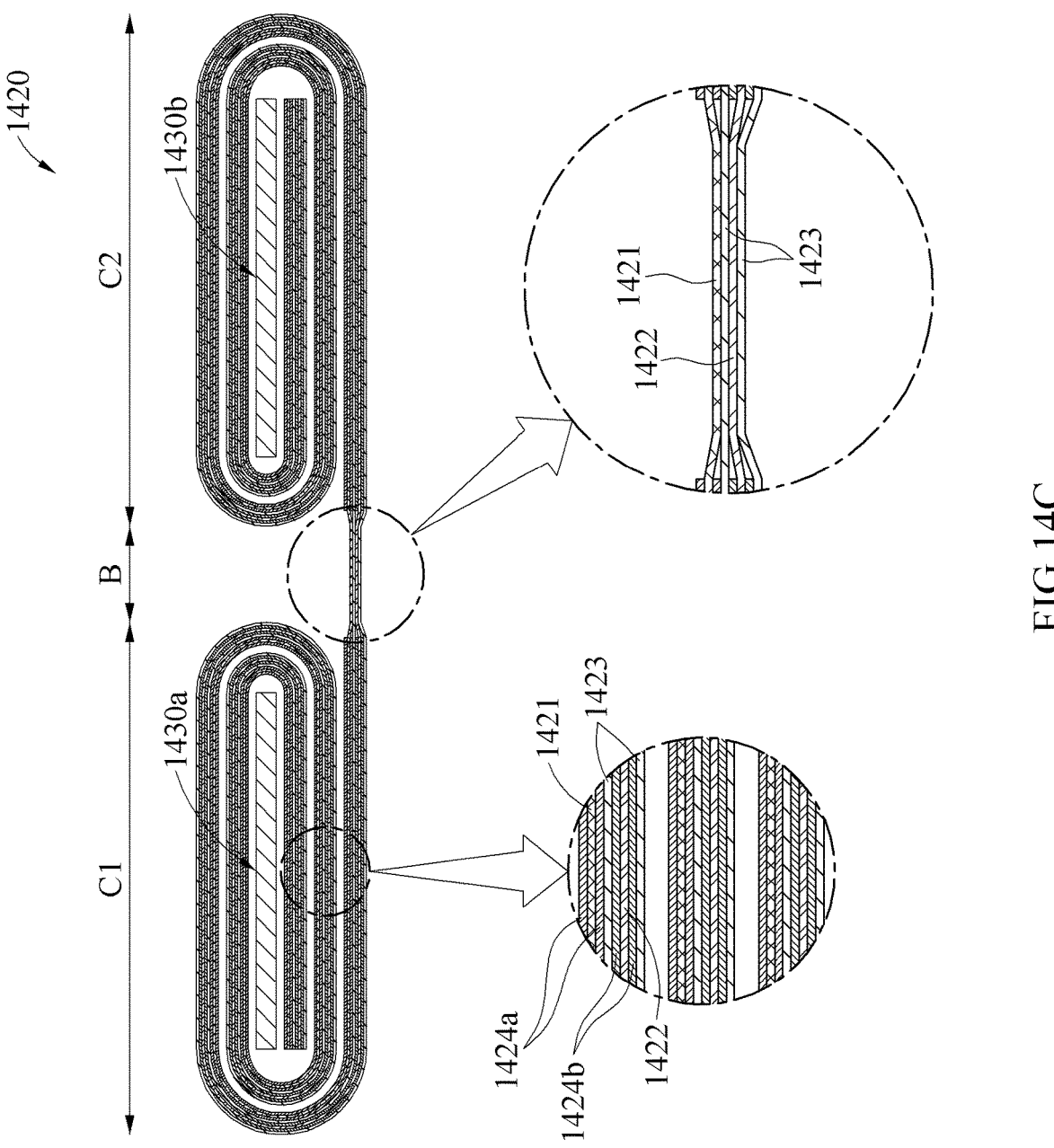
FIG. 14C is a cross-sectional view of an electrode assembly taken along line D-D line of FIG. 14A according to various embodiments.

FIG. 14A is a perspective view of an electrode assembly according to various embodiments, FIG. 14B is a perspective view of a protective frame with the electrode assembly omitted from FIG. 14A according to various embodiments, and FIG. 14C is a cross-sectional view of the electrode assembly taken along line D-D of FIG. 14A according to various embodiments.

Referring to FIGS. 14A, 14B and 14C, according to various example embodiments, a battery cell 1310 may include an electrode assembly 1420 received in a pouch (e.g., the pouch 1311 of FIG. 13) and protective frames 1430a and 1430b.

The battery cell 1310 may include a first cell area C1 and a second cell area C2 that are separate from each other, and a folding area B connecting the first cell area C1 and the second cell area C2. The battery cell 1310 may include a plurality of substrates 1421 and 1422 stacked while being electrically insulated through a separator 1423, and mixture layers 1424a and 1424b.

The substrates 1421 and 1422 may have a longitudinal direction and be stacked in a stacking direction. For example, the substrates 1421 and 1422 may have the longitudinal direction extending from the first cell area C1 to the second cell area C2 through the folding area B. The substrates 1421 and 1422 may include a positive electrode substrate 1421 and a negative electrode substrate 1422 that form opposite electrodes and are stacked with the separator 1423 therebetween.

The electrode assembly 1420 may be wound around a winding axis parallel to a folding axis in each cell area. For example, the substrates 1421 and 1422 disposed in the first cell area C1 may be wound around a first winding axis X1, and the substrates 1421 and 1422 disposed in the second cell area C2 may be wound around a second winding axis X2. Electrode leads may be respectively connected to the positive electrode substrate 1421 and the negative electrode substrate 1422. On any one outer surface of the stacked positive electrode substrate 1421 and the stacked negative electrode substrate 1422, the separator 1423 may be stacked to maintain an electrically insulated state with substrates forming another electrode while being wound.

The mixture layers 1424a and 1424b may be applied to surfaces of the substrates 1421 and 1422, respectively. For example, a positive electrode mixture layer 1424a may be applied to the surface of the positive electrode substrate 1421, and a negative electrode mixture layer 1424b may be applied to the surface of the negative electrode substrate 1422.

The mixture layers 1424a and 1424b may be omitted from the surfaces of the substrates 1421 and 1422 disposed in the folding area B. For example, the mixture layers 1424a and 1424b may be applied only to the surfaces of the substrates 1421 and 1422 disposed in the first cell area C1 and the second cell area C2, and not be applied to the surfaces of the substrates 1421 and 1422 disposed in the folding area B. Such a structure may form the electrode assembly 1420 to be thin in the folding area B, enabling a more flexible folding operation in the folding area B.

The protective frames 1430a and 1430b may be connected to a cell area of the electrode assembly 1420 to protect the outer surface of the electrode assembly 1420 from an external impact. The protective frames 1430a and 1430b may be respectively connected to the cell areas C1 and C2 of the electrode assembly 1420. For example, the first protective frame 1430a may be connected to the first cell area C1, and the second protective frame 1430b may be connected to the second cell area C2.

The protective frames 1430a and 1430b may include central portions 1431a and 1431b disposed to cross the cell areas C1 and C2 in a direction perpendicular to the stacking direction of the substrates 1421 and 1422, and covers 1432a and 1432b connected to outer ends of the central portions 1431a and 1431b and extending in a direction parallel to the stacking direction to surround outer surfaces of the cell areas C1 and C2.

The central portions 1431a and 1431b may be inserted in the cell areas C1 and C2 in a direction parallel to the winding axes X1 and X2 of the electrode assembly 1420. For example, the central portion 1431a of the first protective frame 1430a may be inserted to cross the first cell area C1 around the first winding axis X1, and the central portion 1431b of the second protective frame 1430b may be inserted to cross the second cell area C2 around the second winding axis X2. The protective frames 1430a and 1430b may have respective open areas 1434a and 1434b formed in the central portions 1431a and 1431b to collect gas generated by swelling of the battery cell 1310.

The protective frames 1430a and 1430b may include the respective covers 1432a and 1432b connected to any one of both ends of the central portions 1431a and 1431b extending based on the winding axes. For example, the protective frames 1430a and 1430b may include first covers 14321a and 14321b and second covers 14322a and 14322b respectively connected to opposite both ends of the central portions 1431a and 1431b. When viewed in directions of the winding axes X1 and X2, the covers 1432a and 1432b may be formed to cover the outer surface of the electrode assembly 1420. When viewed in the directions of the winding axes X1 and X2, the covers 1432a and 1432b may be formed in substantially the same shape as a shape of the outer surface of the electrode assembly 1420 or in a shape completely overlapping the shape of the outer surface of the electrode assembly 1420. At least one cover (e.g., the cover 1432b) of the covers 1432a and 1432b of the protective frames 1430a and 1430b may have at least one outlet 1433b through which an electrode lead connected to the electrode assembly 1420 is pulled out.

Although the first protective frame 1430a and the second protective frame 1430b are illustrated in FIG. 14 as having the similar shape to each other for the convenience of description, the shape of the first protective frame 1430a and the second protective frame 1430b is not limited to the illustrated example shape. For example, at least a portion of the first protective frame 1430a and the second protective frame 1430b may be formed in another shape. For example, the protective frames 1430a and 1430b may selectively have the respective open areas 1434a and 1434b in the central portions 1431a and 1431b, and the covers 1432a and 1432b of the protective frames 1430a and 1430b may be formed in different shapes. In addition, the outlet 1433b may be formed at various positions of the covers 1432a and 1432b according to the shape of the electrode assembly 1420.

According to various example embodiments, an electronic device (e.g., 201) may include: a housing (e.g., 210), printed circuit boards (PCBs) (e.g., 251 and 252) disposed inside the housing, and a battery (e.g., 200) disposed inside the housing and configured to supply power to the electronic device. The battery (e.g., 300) may include: a battery cell (e.g., 310) including an electrode assembly (e.g., 320) including a plurality of substrates (e.g., 521 and 522) having surfaces coated with a mixture layer (e.g., 524) and stacked and insulated through a separator (e.g., 523) and including a pouch (e.g., 311) receiving therein the electrode assembly, a protective frame (e.g., 530) received in the pouch and configured to protect the electrode assembly from an external impact, and a protection circuit module (PCM) (e.g., 340) including circuitry connected to the battery cell and electrically connected to the PCBs. The protective frame (e.g., 530) may include: a central portion (e.g., 631) disposed to cross an inside of the electrode assembly (e.g., 320) in a direction perpendicular to a stacking direction of the substrates (e.g., 521 and 522); and at least one cover (e.g., 632) connected to at least one end of the central portion and extending in a direction parallel to the stacking direction to surround at least a portion of an outer surface of the electrode assembly.

The electrode assembly (e.g., 320) may be wound along an outer surface of the central portion around a first winding axis perpendicular to the stacking direction of the substrates.

With the electrode assembly (e.g., 320) viewed in the first winding axis direction, the outer surface of the electrode assembly may be covered by the cover.

When viewed in the first winding axis direction, the cover may be formed in substantially the same shape as a shape of the outer surface of the electrode assembly (e.g., 320).

The central portion (e.g., 631) may be disposed between a pair of neighboring substrates (e.g., 721 and 722), and the central portion (e.g., 631) may have a surface perpendicular to the stacking direction.

When viewed in the stacking direction, the cover (e.g., 632) may be formed along a perimeter of the central portion (e.g., 631) to surround a perimeter of the electrode assembly (e.g., 720).

When viewed in the stacking direction, the central portion (e.g., 631) may have a polygonal shape corresponding to that of the substrates (e.g., 721 and 722), and the cover (e.g., 632) may be formed at an end forming a corner of the central portion.

The battery cell (e.g., 310) may further include electrode leads (e.g., 313a and 313b) connected to the electrode assembly (e.g., 320), and the protective frame (e.g., 530) may have an outlet (e.g., 633) formed in the cover through which the electrode leads are extended.

The central portion (e.g., 631) may include an open area (e.g., 634) passing through the surface.

When viewed in the stacking direction, the central portion (e.g., 631) may further include a connecting portion (e.g., 6310) that divides the open area (e.g., 634) into a plurality of areas (e.g., 6341 and 6342).

When viewed in the stacking direction, the central portion (e.g., 631) may be formed in a size that covers only a portion of the substrates (e.g., 321 and 322).

When viewed in the stacking direction, at least one cover (e.g., 6321) may have a first width corresponding to a width of the substrates (e.g., 321 and 322), and the central portion (e.g., 631) may have a second width narrower than the first width.

The battery (e.g., 300) may include a plurality of protective frames (e.g., 1030a and 1030b). With the electrode assembly (e.g., 720) viewed in the stacking direction, the protective frames may include respective covers (e.g., 1032a and 1032b) that cover different portions of the outer surface of the electrode assembly.

Based on a length in the stacking direction, the cover (e.g., 932) may have substantially the same length as the electrode assembly (e.g., 720) or have a length greater than that of the electrode assembly.

The protective frame (e.g., 730) may comprise a composite material including at least one of polyethylene terephthalate (PET) and polycarbonate (PC).

According to various example embodiments, an electronic device (e.g., 201) may include: a housing (e.g., 210), a plurality of printed circuit boards (PCBs) (e.g., 251 and 252) disposed inside the housing, and a battery (e.g., 300) disposed inside the housing and configured to supply power to the electronic device. The battery (e.g., 300) may include: an electrode assembly (e.g., 320) including a plurality of substrates (e.g., 521 and 522) having surfaces coated with a mixture layer (e.g., 524) and stacked and insulated through a separator (e.g., 523) and configured to be wound around a first winding axis, a protective frame (e.g., 530) including a central portion (e.g., 631) inserted in the electrode assembly in a direction parallel to the first winding axis and a cover (e.g., 632) connected to an end of the central portion and covering at least a portion of an outer surface of the electrode assembly, a pouch in which the electrode assembly (e.g., 320) and the protective frame (e.g., 530) are disposed, and a protection circuit module (PCM) (e.g., 340) including circuitry connected to the electrode assembly and electrically connected to the PCBs;

With the electrode assembly (e.g., 320) viewed in a direction of the first winding axis, the cover (e.g., 632) may include a first cover (e.g., 6321) and a second cover (e.g., 6322) respectively connected to both ends of the central portion (e.g., 631) to overlap the outer surface of the electrode assembly 320.

The battery (e.g., 300) may further include electrode leads (e.g., 313a and 313b) connected to the electrode assembly (e.g., 320) and extended to an outside of the pouch (e.g., 311). At least one of the first cover (e.g., 6321) and the second cover (e.g., 6322) may have an outlet (e.g., 633) formed to allow the electrode leads (e.g., 313a and 313b) to be pulled out.

The central portion (e.g., 631) may include an open area (e.g., 634) perpendicular to the first winding axis and formed in the stacking direction passing through the substrates (e.g., 321 and 322).

According to various example embodiments, a battery (e.g., 1200) disposed inside an electronic device (e.g., 1101) may include: a battery cell (e.g., 1310) including a pair of cell areas and disposed in parallel to each other with an interval therebetween and a folding area foldably connecting the cell areas, a plurality of protective frames (e.g., 1430a and 1430b) respectively connected to the cell areas and configured to protect respective outer surfaces of the cell areas, and a protection circuit module (PCM) (e.g., 1340) including circuitry connected to the battery cell and electrically connected to a printed circuit board (PCB) (e.g., 1250) of the electronic device. The battery cell (e.g., 1310) may include a plurality of substrates (e.g., 1421 and 1422) that have surfaces coated with a mixture layer (e.g., 1424), have a longitudinal direction extending along the cell areas with the folding area therebetween, and are stacked and insulated through a separator (e.g., 1423). The protective frames (e.g., 1430a and 1430b) may include a central portion (e.g., 1431) disposed to cross the cell areas of the electrode assembly (e.g., 1320) in a direction perpendicular to a stacking direction of the substrates (e.g., 1421 and 1422), and at least one cover (e.g., 1432) connected to an end of an outer side of the central portion and extending in a direction parallel to the stacking direction to surround an outer surface of the cell areas.

While the disclosure has been illustrated and described with reference to various example embodiments, it will be understood that the various example embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:
   a housing;
   a printed circuit board (PCB) disposed inside the housing; and
   a battery disposed inside the housing and configured to supply power to the electronic device, wherein the battery comprises:
      a battery cell comprising an electrode assembly comprising a plurality of substrates having a surface coated with a mixture layer, the plurality of substrates being stacked and insulated through a separator, and further comprising a pouch in which the electrode assembly is disposed;
      a protective frame accommodated inside the pouch and configured to protect the electrode assembly from an external impact; and
      a protection circuit module (PCM) comprising circuitry connected to the battery cell and electrically connected to the PCB,
   wherein the protective frame comprises:
      a central portion disposed to cross an inside of the electrode assembly in a direction perpendicular to a stacking direction of the substrates; and
      at least one cover connected to at least one end of the central portion and extending in a direction parallel to the stacking direction to cover at least a portion of an outer surface of the electrode assembly
   wherein the battery comprises a plurality of protective frames, and
   wherein, with the electrode assembly viewed in the stacking direction, each of the protective frames covers a different portion of the outer surface of the electrode assembly.

2. The electronic device of claim 1, wherein the electrode assembly is wound along an outer surface of the central portion around a first winding axis perpendicular to the stacking direction of the substrates.

3. The electronic device of claim 2, wherein, when viewed in a direction of the first winding axis, the outer surface of the electrode assembly is covered by the cover.

4. The electronic device of claim 2, wherein, when viewed in a direction of the first winding axis, the cover has substantially a same shape as a shape of the outer surface of the electrode assembly.

5. The electronic device of claim 1, wherein the central portion is disposed between a pair of neighboring substrates among the substrates, and has a surface perpendicular to the stacking direction.

6. The electronic device of claim 5, wherein, when viewed in the stacking direction, the cover is connected along a perimeter of the central portion to surround a perimeter of the electrode assembly.

7. The electronic device of claim 5, wherein, when viewed in the stacking direction, the central portion has a polygonal shape corresponding to the substrates, and
   the cover is formed at each end forming a corner of the central portion.

8. The electronic device of claim 1, wherein the battery cell further comprises: an electrode lead connected to the electrode assembly,
   wherein the protective frame has an outlet formed in the cover through which the electrode lead extends.

9. The electronic device of claim 1, wherein the central portion comprises an open area passing through a surface of the central portion.

10. The electronic device of claim 9, wherein, when viewed in the stacking direction, the central portion further comprises a connecting portion dividing the open area into a plurality of areas.

11. The electronic device of claim 1, wherein, when viewed in the stacking direction, the central portion has a size covering only a portion of the substrates.

12. The electronic device of claim 11, wherein, when viewed in the stacking direction, the at least one cover has a first width corresponding to a width of the substrates, and

the central portion has a second width less than the first width.

13. The electronic device of claim 1, wherein, based on a length in the stacking direction, the cover has a length greater than or substantially equal to that of the electrode assembly.

14. The electronic device of claim 1, wherein the protective frame comprises a composite material comprising at least one of polyethylene terephthalate (PET) and polycarbonate (PC).

15. An electronic device, comprising:

a housing;

a printed circuit board (PCB) disposed inside the housing;

a battery disposed inside the housing and configured to supply power to the electronic device, wherein the battery comprises:

an electrode assembly comprising a plurality of substrates having a surface coated with a mixture layer, the plurality of substrates being stacked and insulated through a separator, and wound around a first winding axis;

a protective frame comprising a central portion inserted in the electrode assembly in a direction parallel to the first winding axis, and a cover connected to an end of the central portion and covering at least a portion of an outer surface of the electrode assembly;

a pouch in which the electrode assembly and the protective frame are disposed; and a protection circuit module (PCM) comprising circuitry connected to the electrode assembly and electrically connected to the PCB, wherein, with the electrode assembly viewed in a direction of the first winding axis, the cover comprises a first cover and a second cover respectively connected to both ends of the central portion to overlap the outer surface of the electrode assembly.

16. The electronic device of claim 15, wherein the battery further comprises an electrode lead connected to the electrode assembly and extending to an outside of the pouch, and an outlet through which the electrode lead extends is formed in at least one of the first cover and the second cover.

17. The electronic device of claim 15, wherein the central portion comprises an open area perpendicular to the first winding axis and passing through the substrates in a stacking direction.

18. A battery disposed inside an electronic device, comprising:

a battery cell comprising a pair of cell areas arranged at a specified interval therebetween, and a folding area foldably connecting the cell areas;

a plurality of protective frames connected to the cell areas and configured to protect an outer surface of the cell areas; and a protection circuit module (PCM) comprising circuitry connected to the battery cell and electrically connected to a printed circuit board (PCB) of the electronic device, wherein the battery cell comprises:

an electrode assembly including a plurality of substrates having a surface coated with a mixture layer, having a longitudinal direction extending along the cell areas with the folding area therebetween, the plurality of substrates being stacked and insulated through a separator, wherein each of the protective frames comprises:

a central portion disposed to cross the cell areas of the electrode assembly in a direction perpendicular to the stacking direction of the substrates; and at least one cover connected to an end on an outer side of the central portion and extending in a direction parallel to the stacking direction to cover the cell areas.

* * * * *